United States Patent
Bodorlo

(10) Patent No.: US 10,089,096 B2
(45) Date of Patent: Oct. 2, 2018

(54) PROGRESS TRACKING SYSTEM AND METHOD

(71) Applicant: Tivadar Bodorlo, Delray Beach, FL (US)

(72) Inventor: Tivadar Bodorlo, Delray Beach, FL (US)

(*) Notice: Subject to any disclaimer, the term of this patent is extended or adjusted under 35 U.S.C. 154(b) by 276 days.

(21) Appl. No.: 14/808,640

(22) Filed: Jul. 24, 2015

(65) Prior Publication Data

US 2016/0026450 A1 Jan. 28, 2016

Related U.S. Application Data

(60) Provisional application No. 62/028,450, filed on Jul. 24, 2014.

(51) Int. Cl.
  *G06F 8/61* (2018.01)
  *H04L 29/08* (2006.01)
  *G06F 9/445* (2018.01)
  *H04W 4/60* (2018.01)

(52) U.S. Cl.
  CPC ........... *G06F 8/61* (2013.01); *H04L 67/02* (2013.01); *H04W 4/60* (2018.02); *G06F 9/44526* (2013.01)

(58) Field of Classification Search
  CPC ....... G06F 8/61; G06F 9/44526; H04L 67/02; H04L 67/32; H04W 4/003
  See application file for complete search history.

(56) References Cited

U.S. PATENT DOCUMENTS

| 8,442,887 | B2 | 5/2013 | Hamann |
| 2003/0135401 | A1 | 7/2003 | Parr |
| 2006/0174302 | A1 | 8/2006 | Mattern et al. |
| 2007/0112788 | A1 | 5/2007 | Kobza et al. |
| 2007/0136300 | A1 | 6/2007 | Chien et al. |
| 2009/0174768 | A1 | 7/2009 | Blackburn et al. |
| 2010/0174656 | A1 | 7/2010 | Nolan |
| 2010/0198652 | A1 | 8/2010 | Spanton, Jr. et al. |
| 2012/0188996 | A1* | 7/2012 | Roka ............... G06F 17/30174 370/350 |
| 2013/0218780 | A1 | 8/2013 | Buzz |
| 2013/0232235 | A1* | 9/2013 | Ma ................... H04L 41/0816 709/219 |

(Continued)

OTHER PUBLICATIONS

Wright, "Update WordPress Sites from Your iPhone with the New iThemes Sync App", Jul. 10, 2014, p. 1-8.*

(Continued)

*Primary Examiner* — Brian J. Gillis
*Assistant Examiner* — Chhian Ling
(74) *Attorney, Agent, or Firm* — The Concept Law Group, PA; Scott M. Garrett

(57) ABSTRACT

A method for synchronization and notification of any online posting and/or uploading of data by an administrator to a computer running a website to a mobile device of a particular user without the need of an external push notification service comprises the steps of using a web-to-app connectivity technology to directly synchronize the posting and the data to the mobile device of the particular user and using the web-to-app connectivity technology to directly sent a notification to the particular user when a new posting or new uploading of data associated with that particular user was posted or uploaded.

4 Claims, 58 Drawing Sheets

(56) References Cited

U.S. PATENT DOCUMENTS

2013/0290052 A1   10/2013  Settino
2014/0129605 A1*  5/2014  Huang .................. G06Q 50/01
                                                   709/201
2014/0325349 A1* 10/2014  Riherd ................. G06F 9/4443
                                                   715/255
2016/0198223 A1*  7/2016  Maluk ................... H04N 5/445
                                                   709/206
2017/0083629 A1*  3/2017  Cai ..................... G06F 3/04817

OTHER PUBLICATIONS

Fylan, "Get Push Notifications from your WordPress Site with Pushover", Jul. 17, 2014, WPsquared.com, 5 pages.*
WordPress, "Content Update Notification", Jul. 12, 2014, 1 page.*
WordPress, "Add the SMS Extension to your Portal", Jul. 2, 2014, WebPortal, 3 pages.*
PlanGrid, http://www.plangrid.com, Dec. 30, 2013.
FieldLens, http://fieldlens.com/features; Dec. 30, 2013.
I-InspectAnything, http://i-inspectanything.com, Dec. 30, 2013.

* cited by examiner

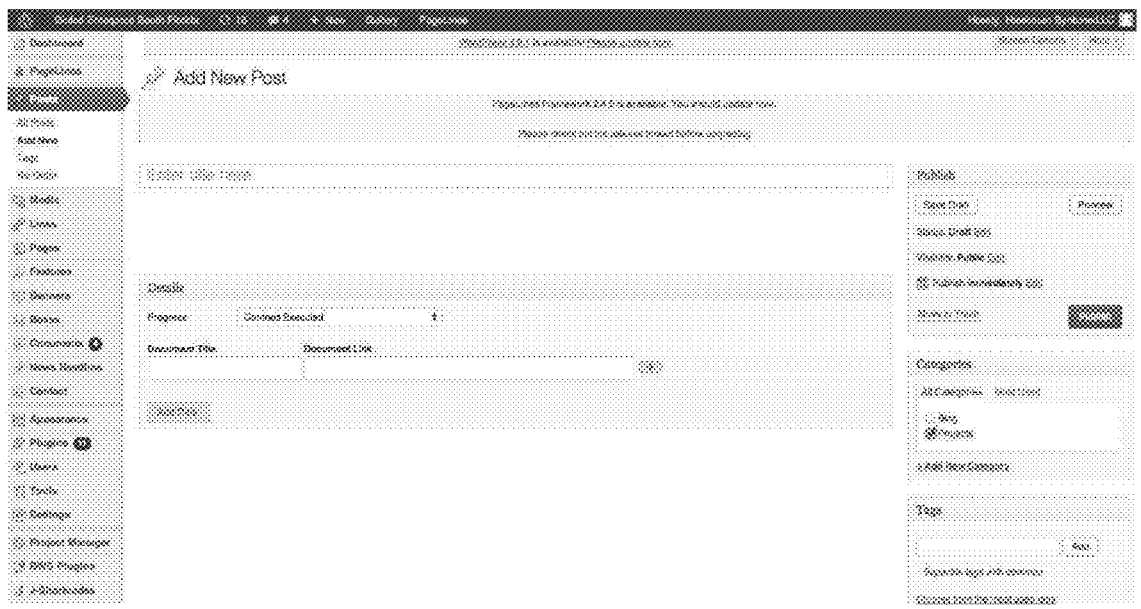
FIG. 4    703
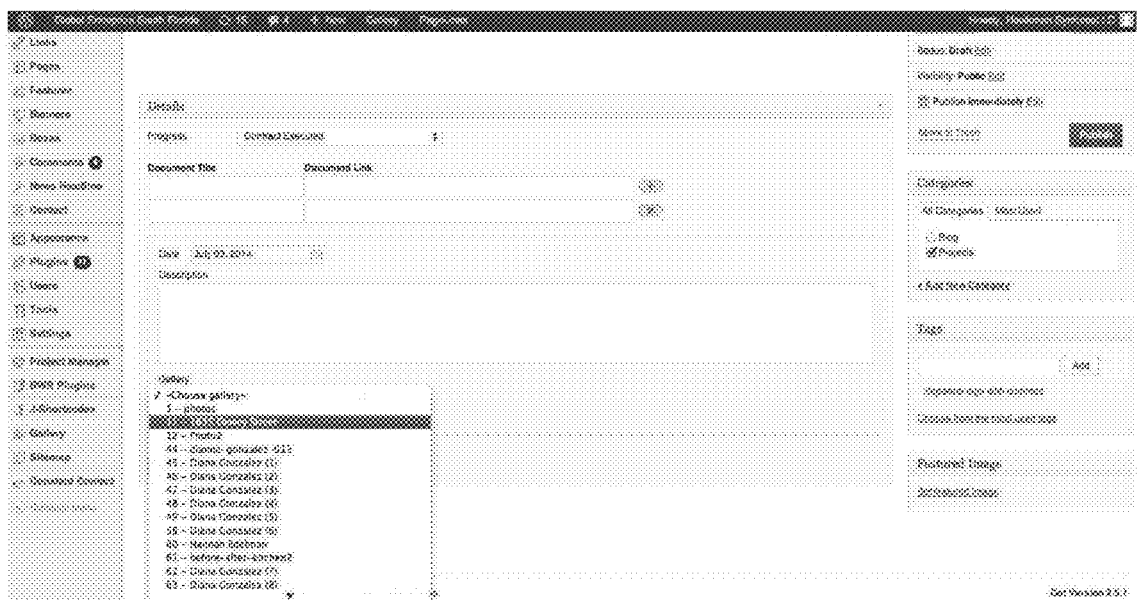
FIG. 6    705

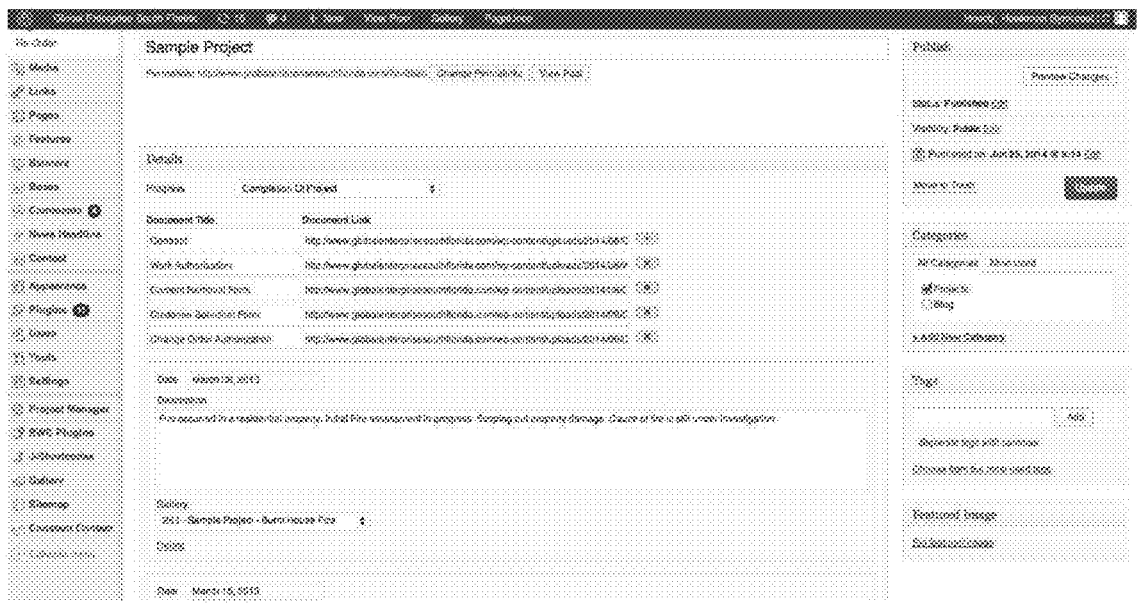
FIG. 5    704
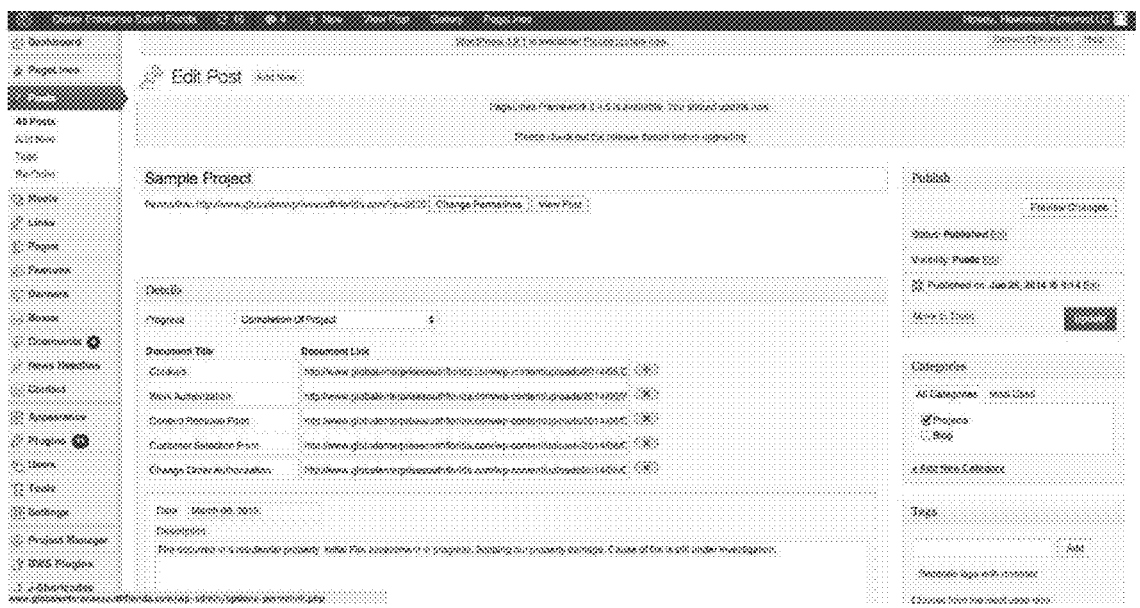
FIG. 7    706

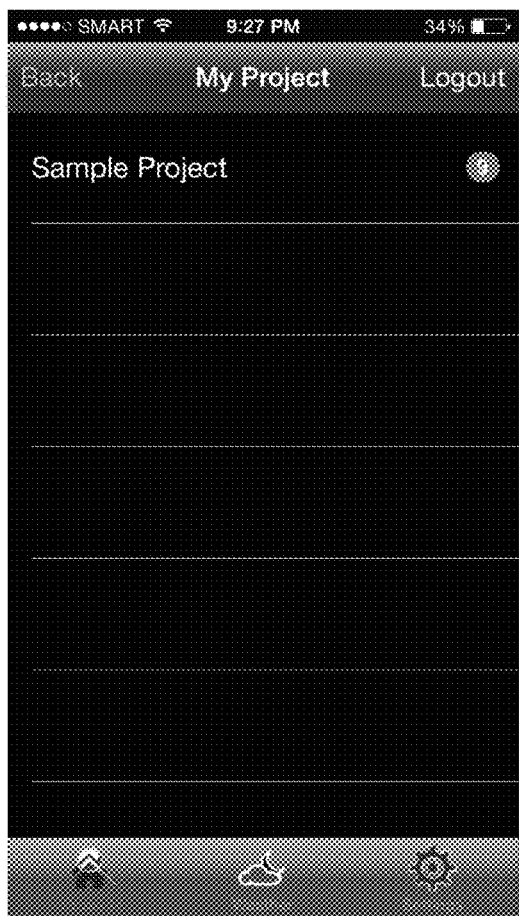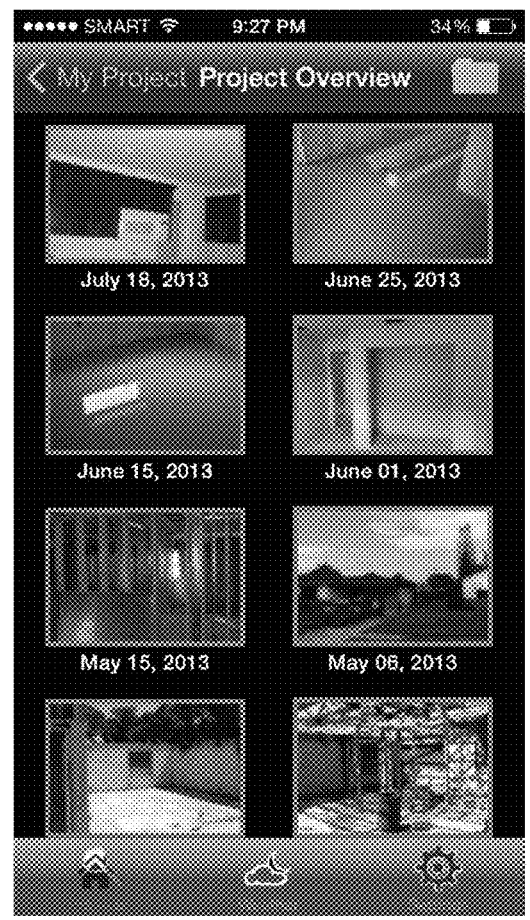
FIG. 16    715                    FIG. 17    716

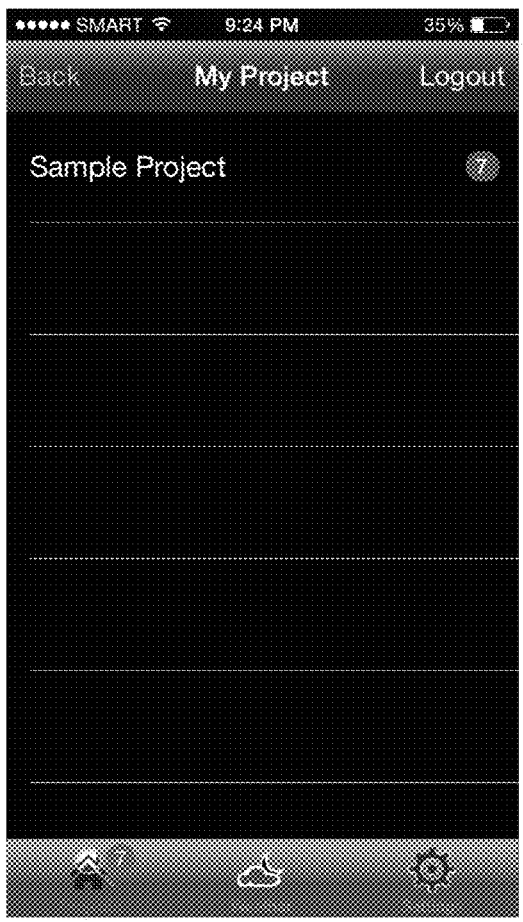
FIG. 18    717
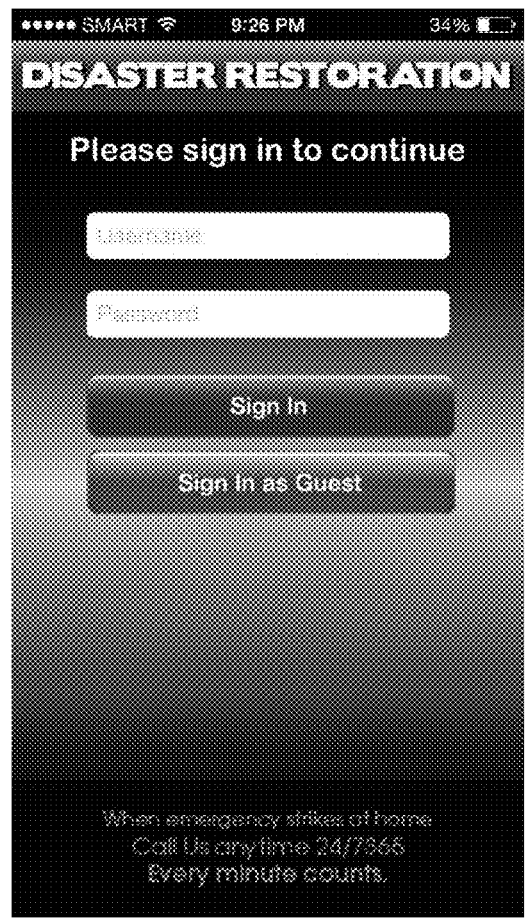
FIG. 19    718

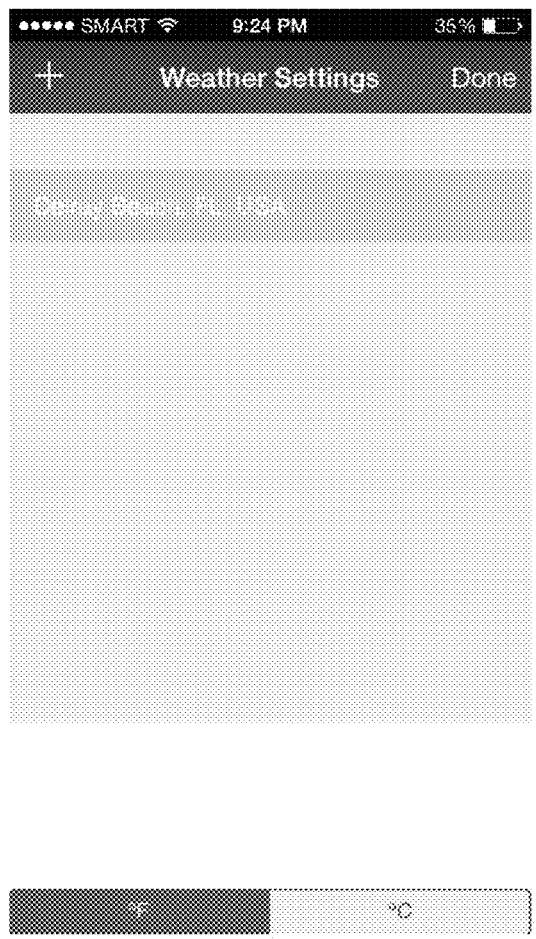
FIG. 20    719
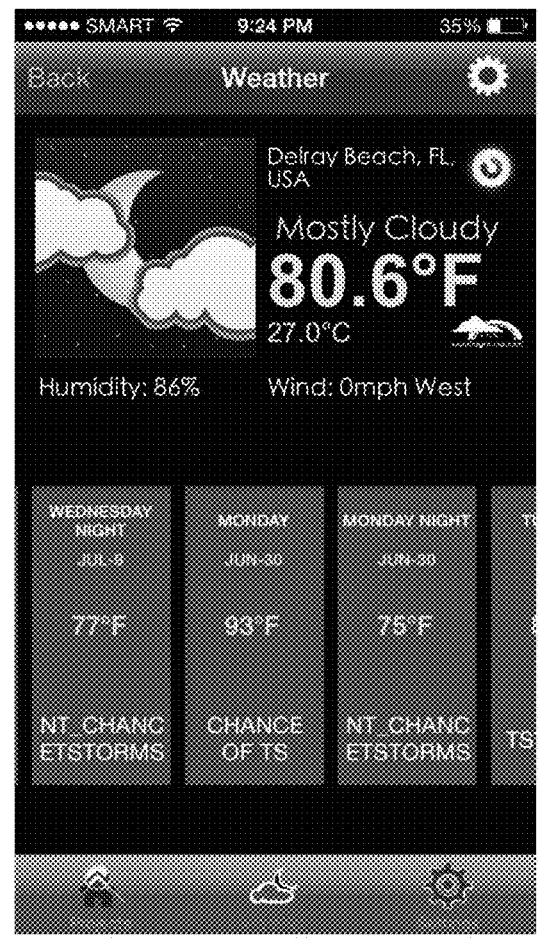
FIG. 21    720

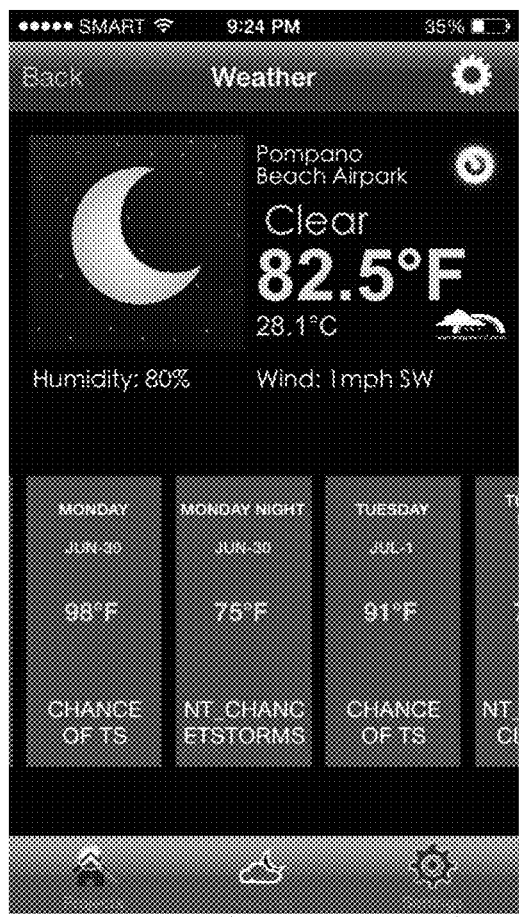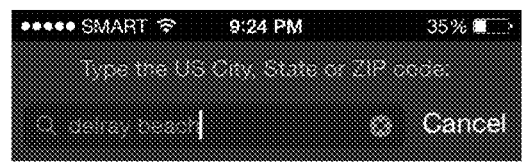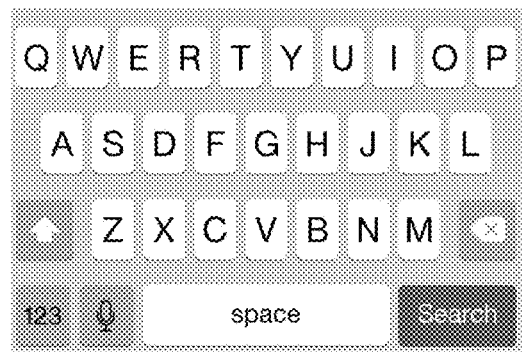
FIG. 22  721              FIG. 23  722

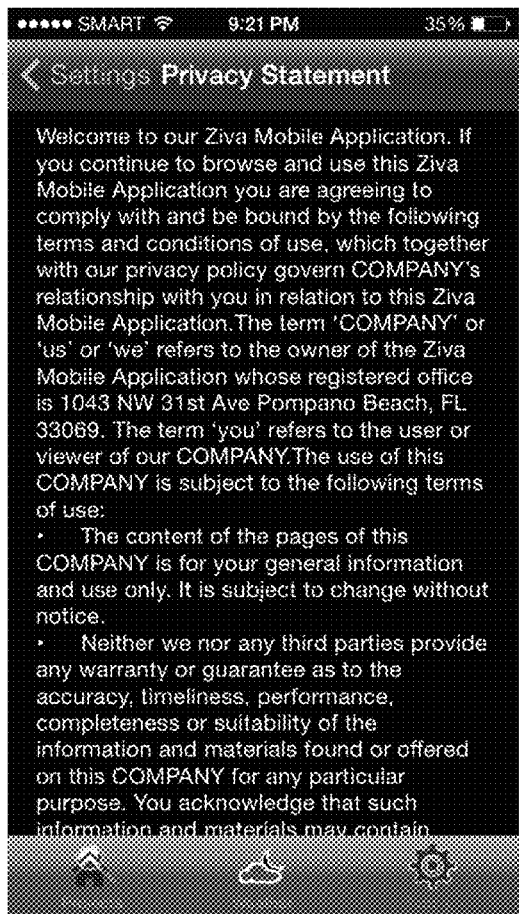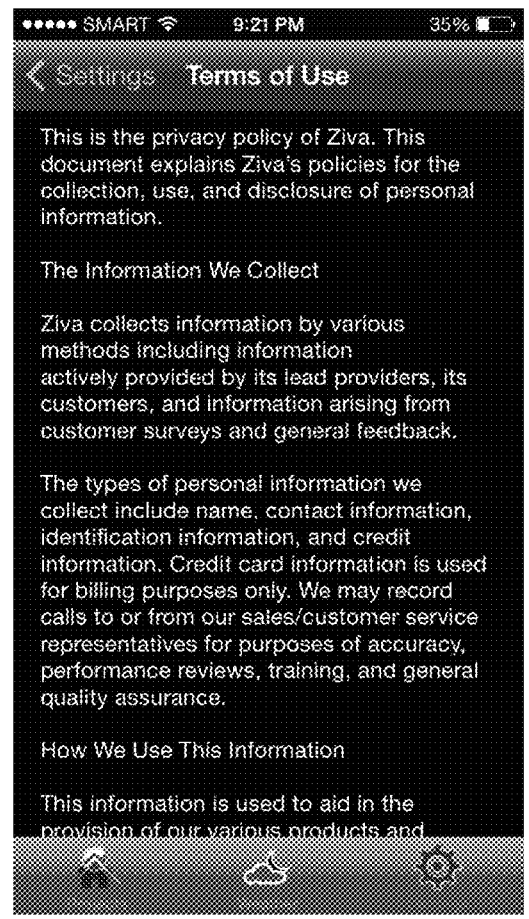
FIG. 24   723                    FIG. 25   724

Disaster Restoration iOS App

CONCEPT:

- Recommended for iPhone users only
- US-based apple accounts can purchase the app
- Compatible with iOS 6.0 or later.
- Search and install "Disaster Restoration" to iOS Devices.
- Ask immediate assistance to the leading company for Restoration Services
- Open the app and login. Contact Global Enterprise South Florida for your credentials.
- Project Dashboard shows projects assigned to your account
- Tapping a project will show list of updates according to date
- Tapping a date will show current project status, gallery of images and description.
- Tapping an image will show full image view
- Full image view supports portrait and landscape orientations.
- The image can be shared to social networking sites.
- Supports push notifications. The device must be connected to the internet. The user must log in to the app. GE must update project posts in the GE website
- Supports user information management.
- Checks latest version of the app.
- Provides current weather condition to the selected location. US locations only.
- Provides a 10-day weather forecast

FIG. 33

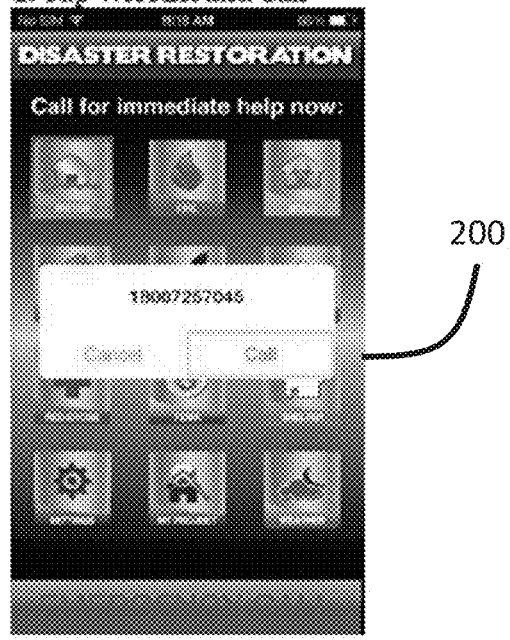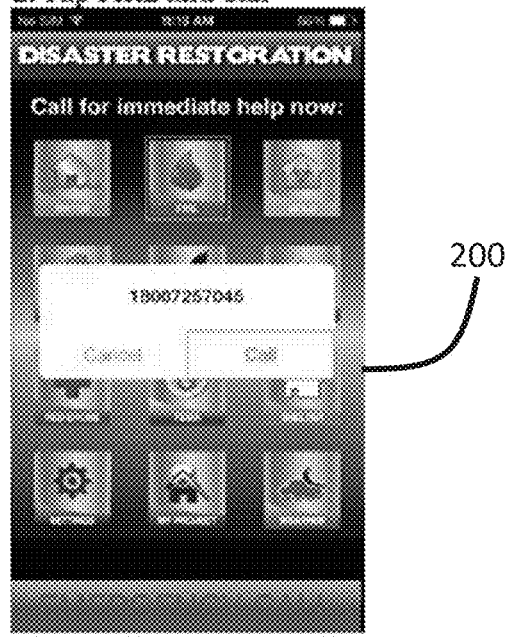
FIG. 35

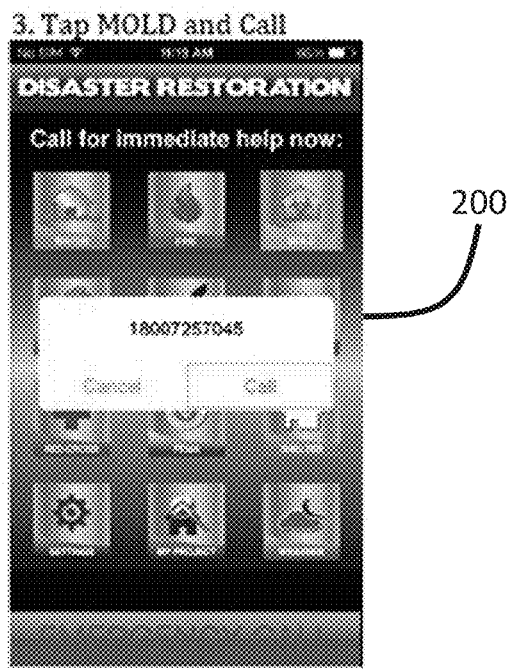
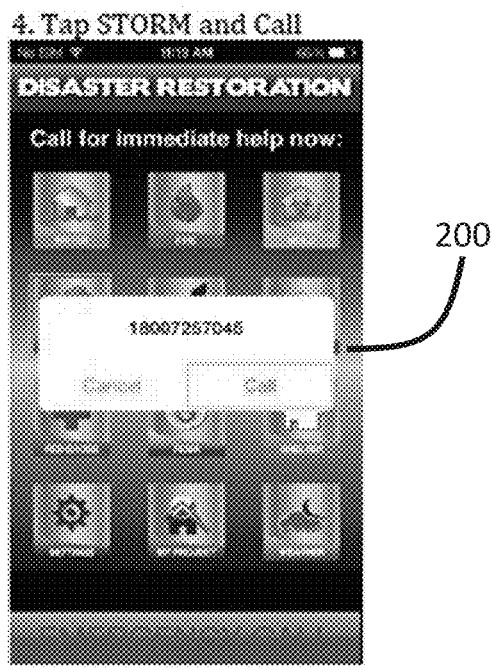
FIG. 36

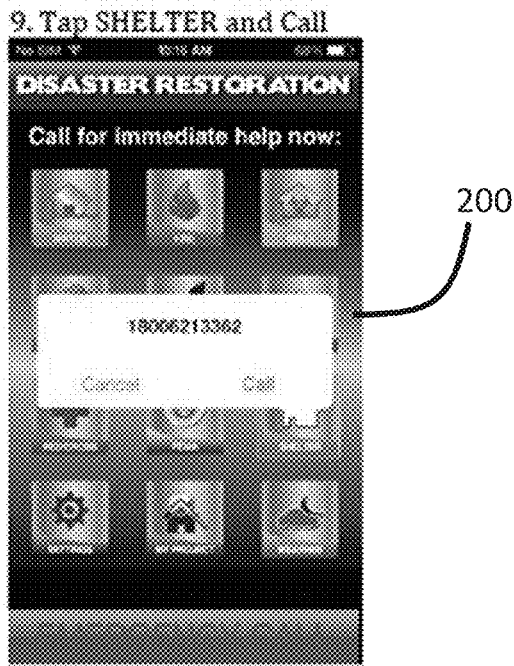
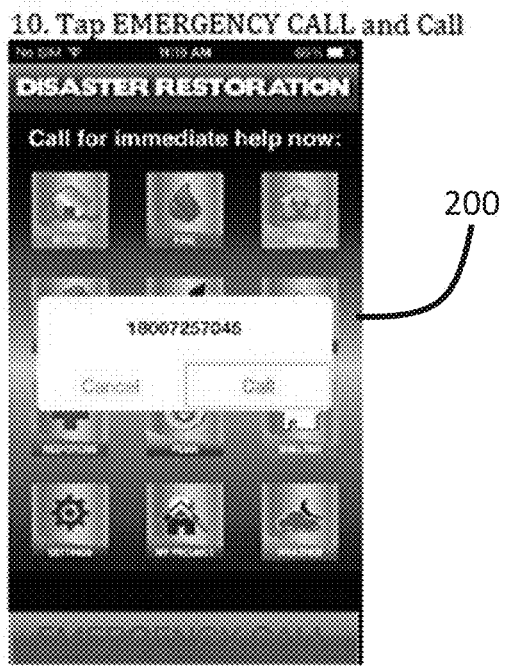
FIG. 39

TO VIEW PROJECT/S:
1. Tap MY PROJECT
2. Login with your username and password.
Let's say, for example, DoeJohn is your username
FIG. 40

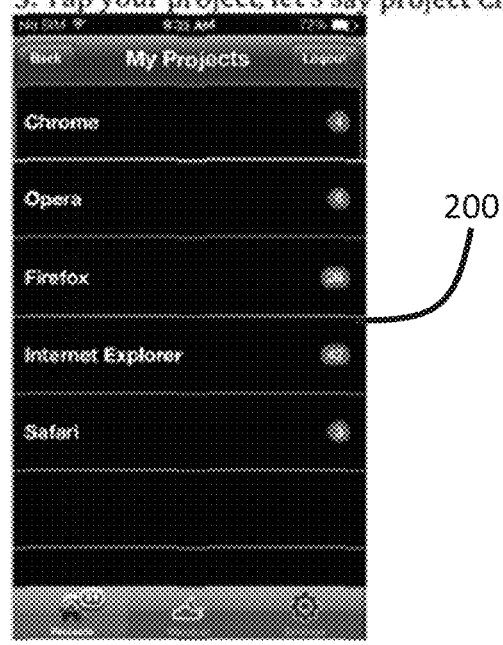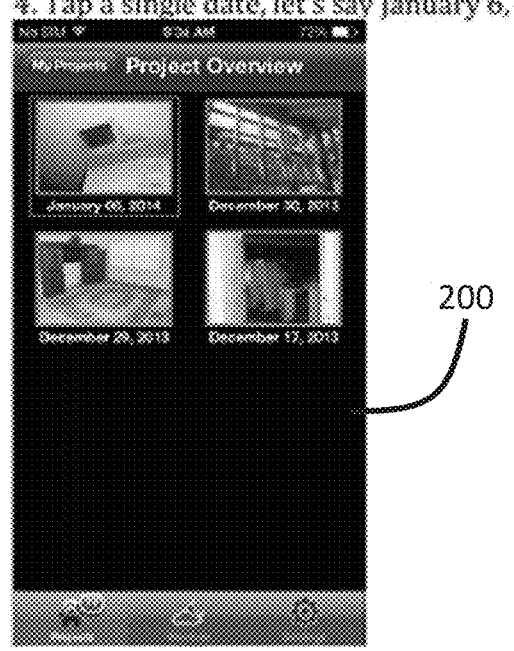
FIG. 41

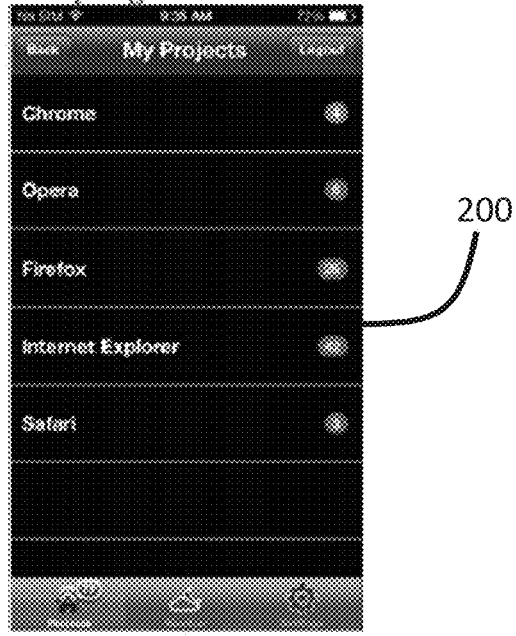
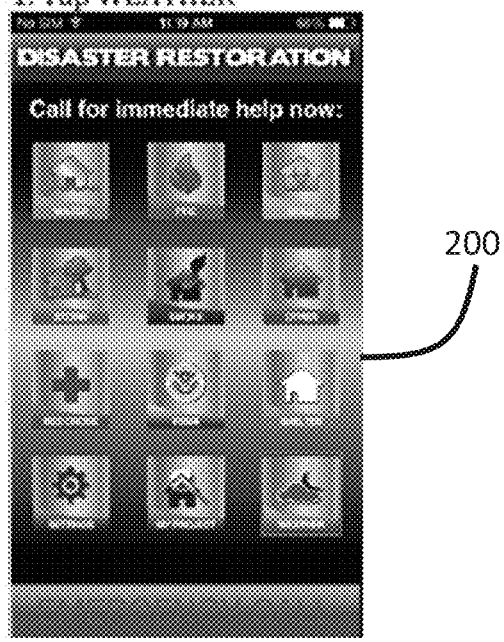
FIG. 43

TO VIEW PROJECT/S:
1. Tap MY PROJECT
 200
2. Login with your username and password.
Let's say, for example, DoeJohn is your username
 200
FIG. 44

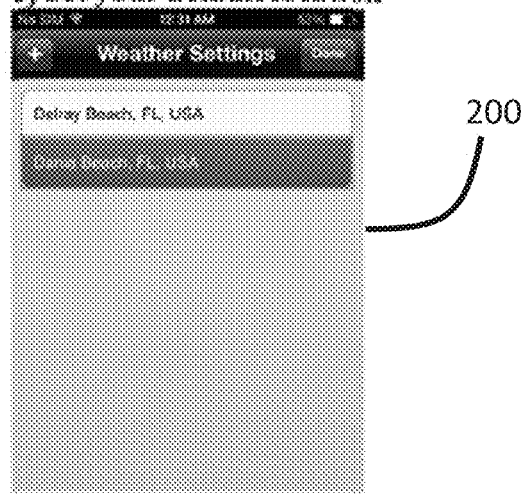
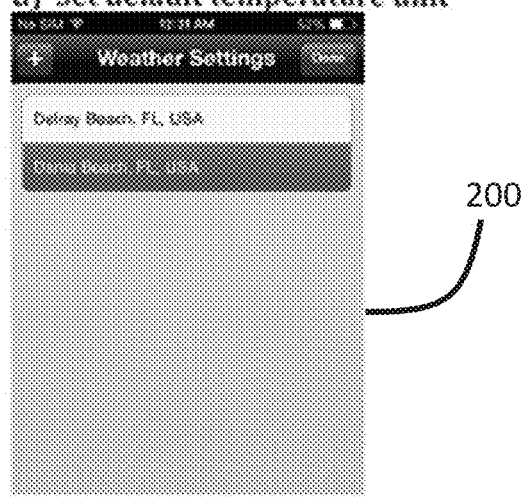
FIG. 47

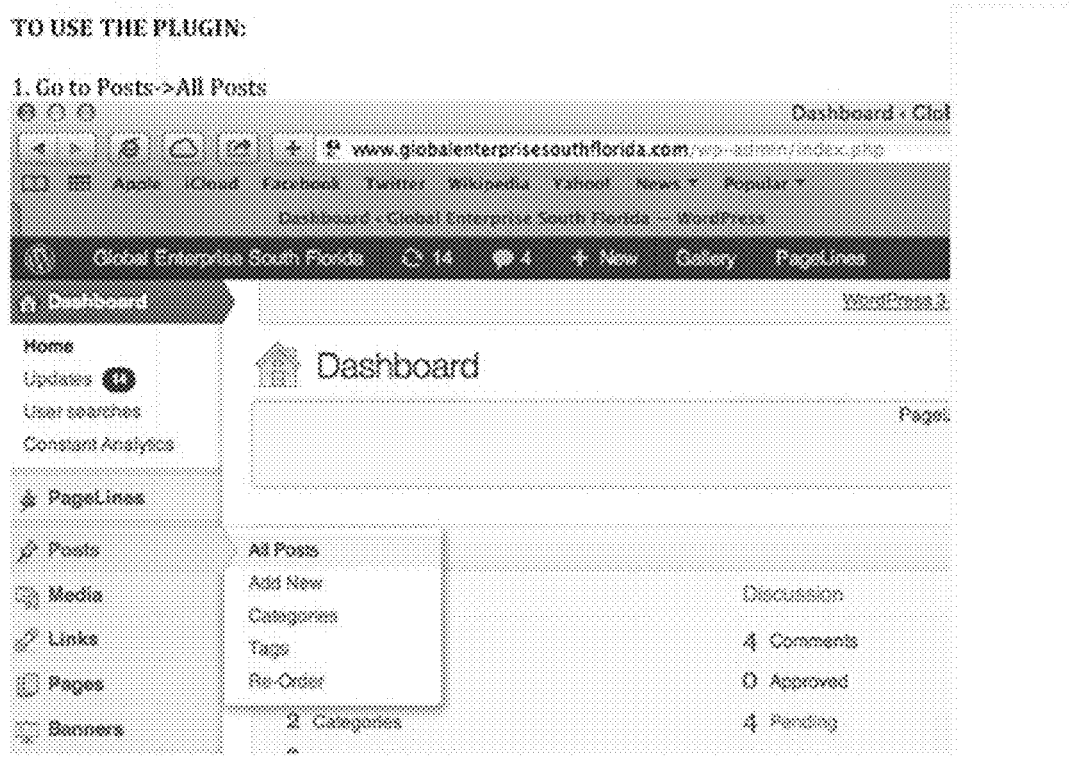
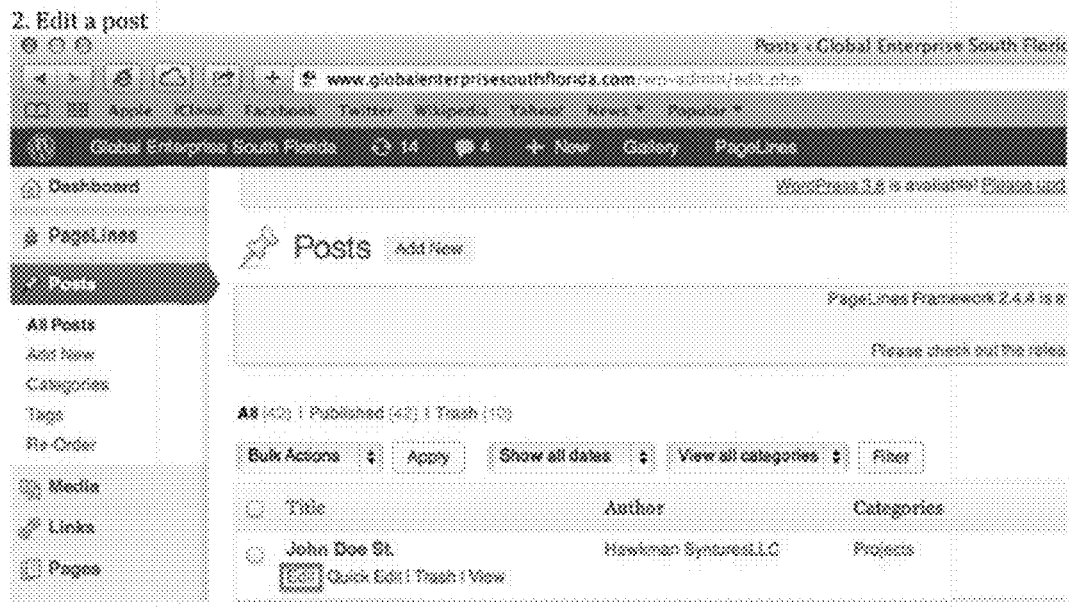
FIG. 53

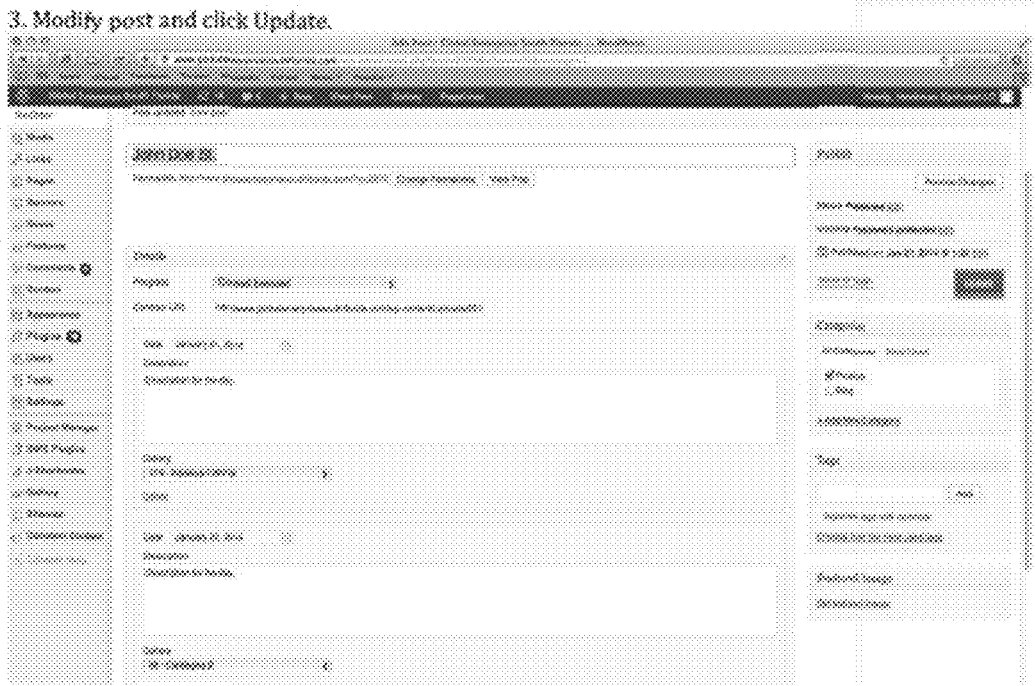
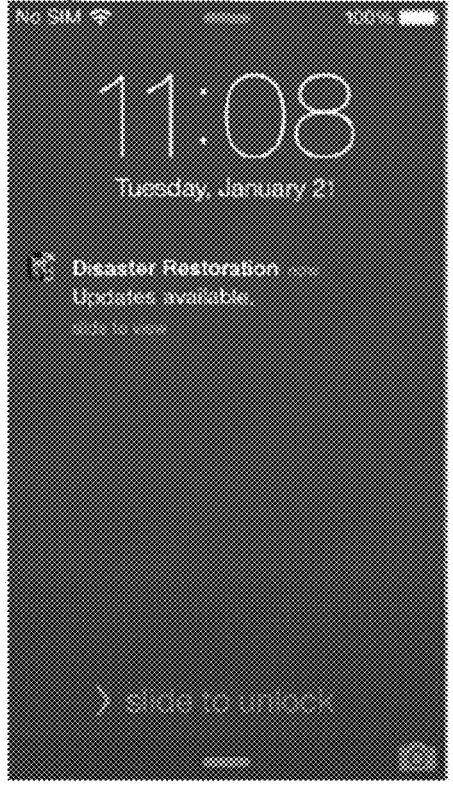
300
FIG. 54

TO USE THE PLUGIN:
ADDING NEW PROJECT:
1. Go to Posts->Add New Post
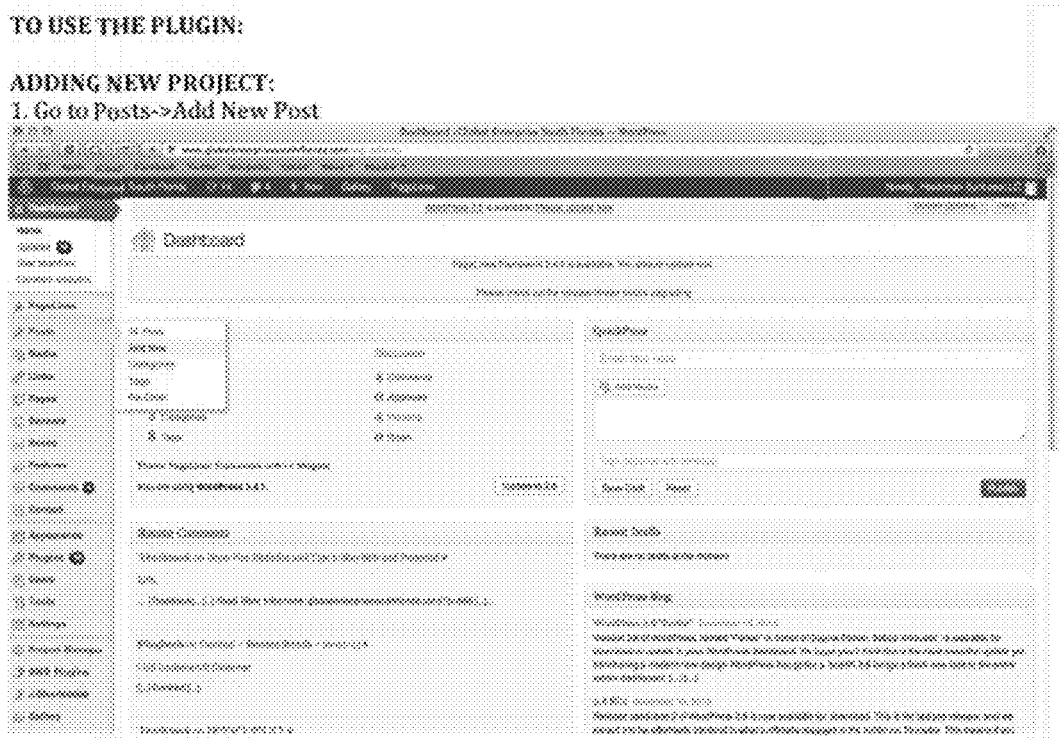
2. Under Categories, select the checkbox "Projects" and fill up necessary items needed.
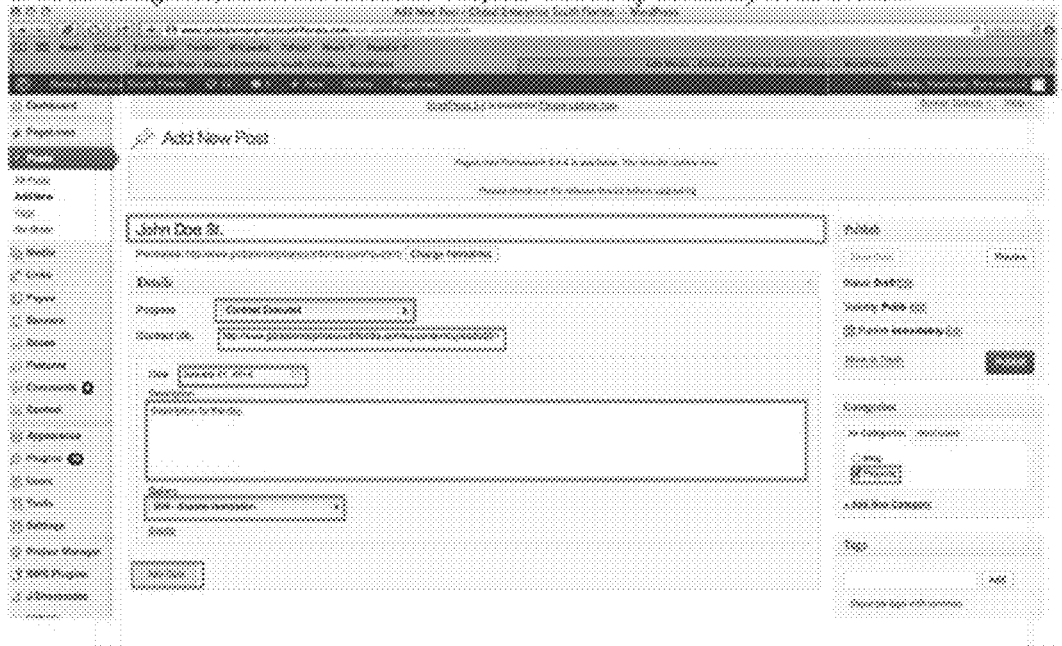
400
FIG. 57

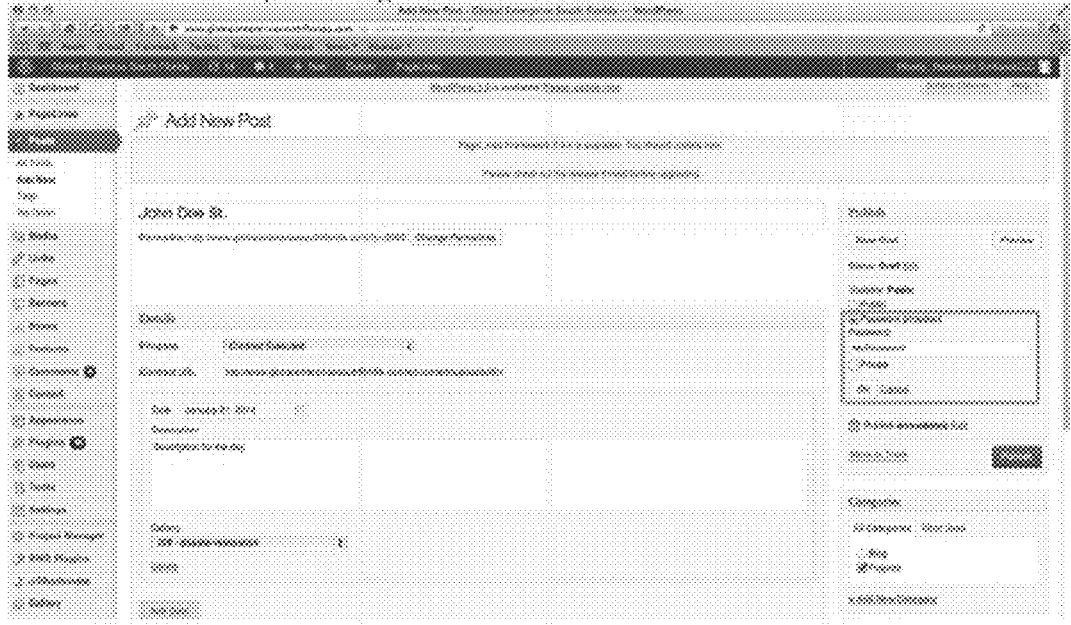
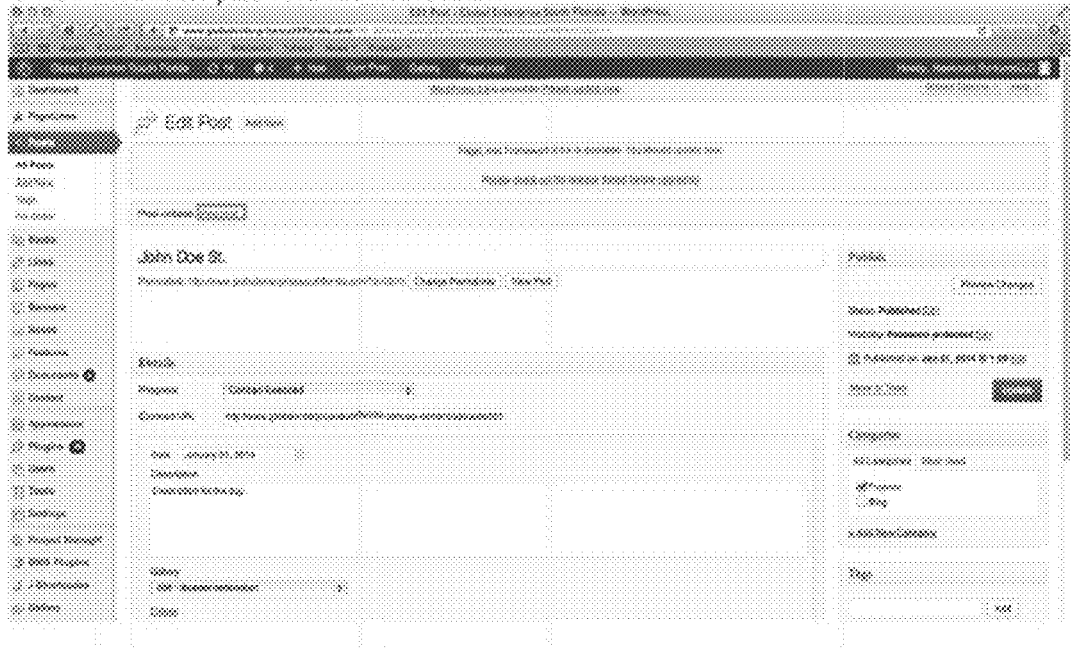
400
FIG. 58

5. Project view.
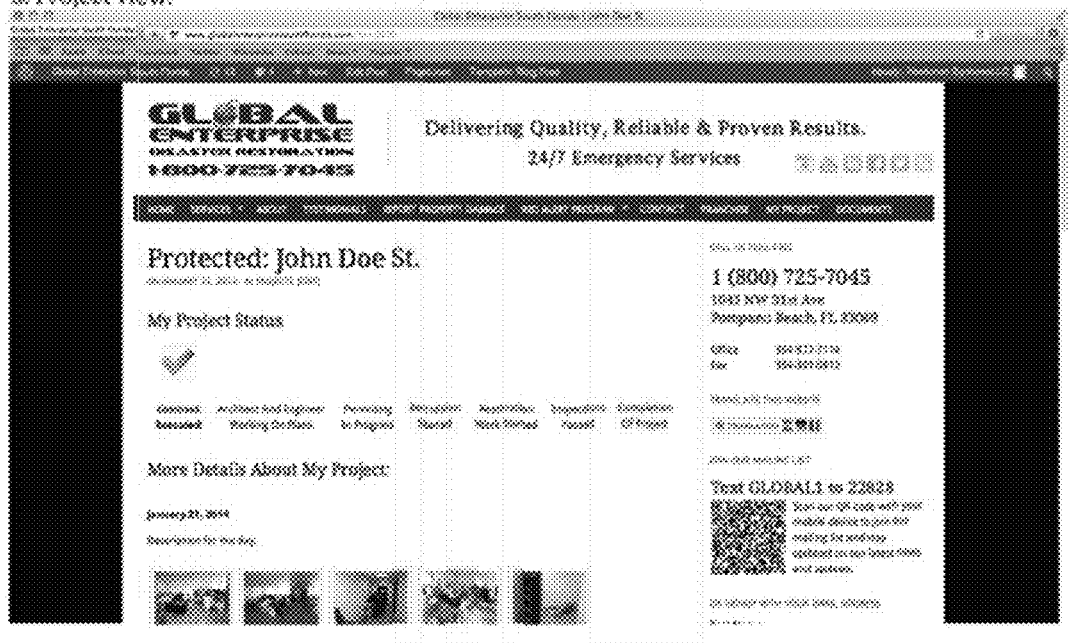
FIG. 59

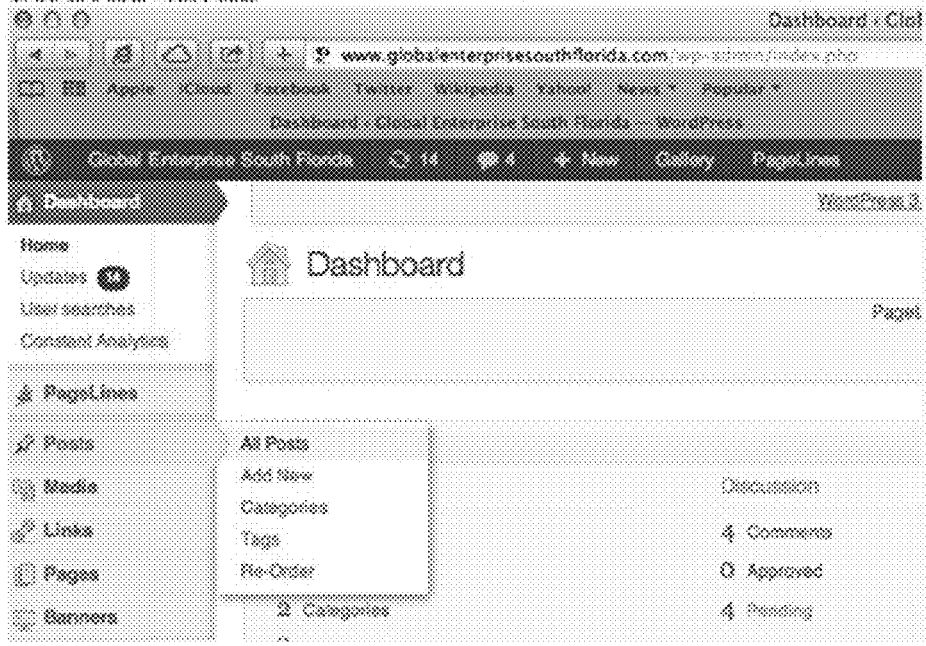
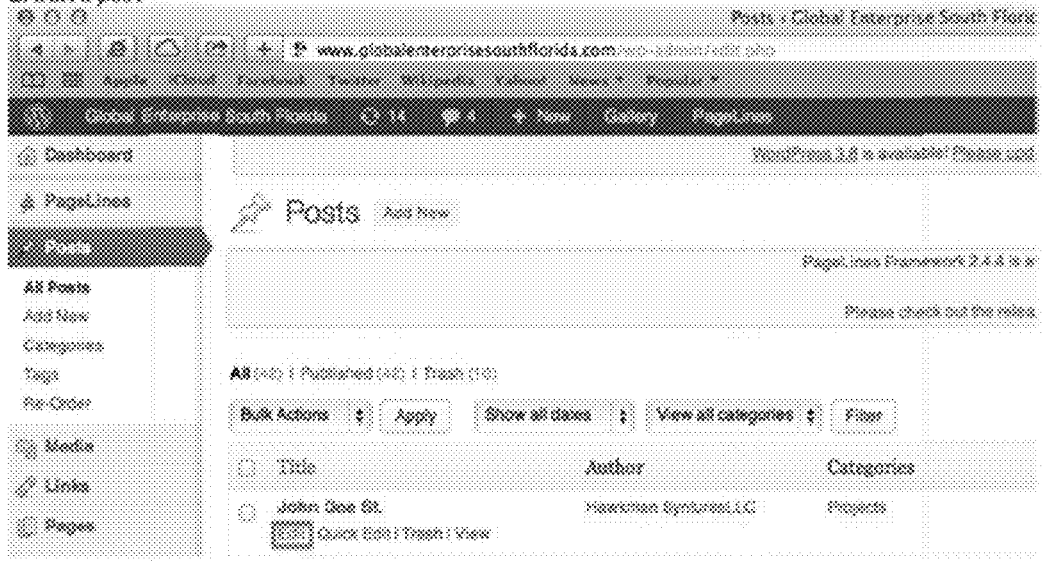
400
FIG. 60

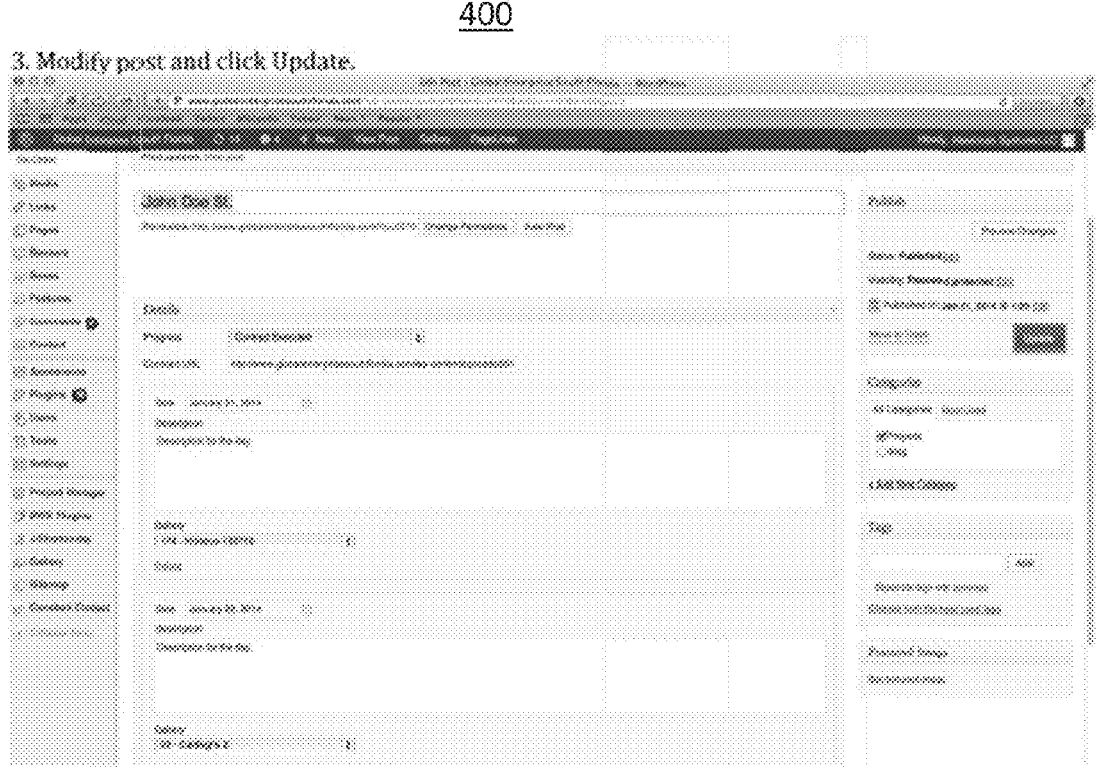
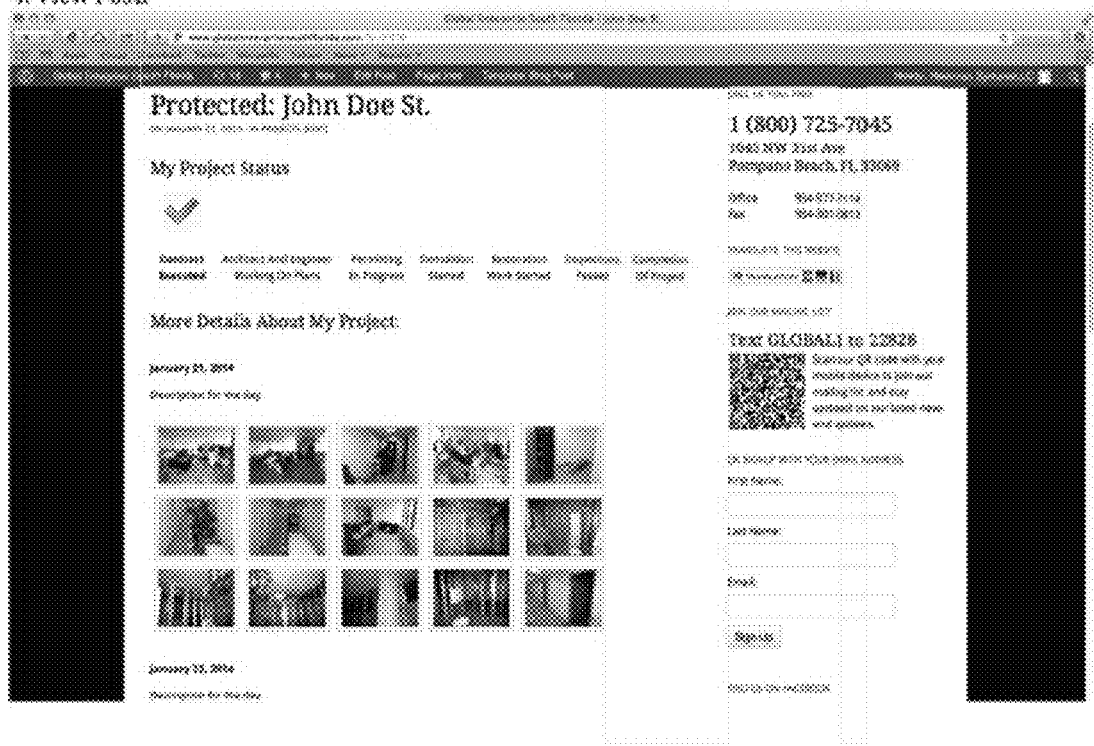
FIG. 61

GE Project Manager Plugin
500

CONCEPT:

- Register user
- Assign new project to existing user
- View project/s of existing user
- Delete assigned project to existing user
- Reset password of existing user

TO INSTALL:

1. Access GE WP Admin and log in

3. Click ADD PROJECT button to add new project. Click Save User

Let say your projects are:
1. Chrome
2. Opera
3. Firefox
4. Internet Explorer
5. Safari 4. An email will be sent to the email address provided with the username and password for Disaster Restoration app.

PROGRESS TRACKING SYSTEM AND METHOD

CROSS-REFERENCE TO RELATED APPLICATION

This application claims the benefit of U.S. Provisional Patent Application No. 62/028,450 filed Jul. 24, 2014, the entirety of which is incorporated by reference.

FIELD OF THE INVENTION

The present invention relates generally to notifying disparate users of mobile networking devices of updated information, and, more particularly, relates to a system and method of providing updates of progress in restoration and construction projects.

BACKGROUND OF THE INVENTION

In the Restoration and Construction industry, there is a need in the art to provide a system and method of electronic tracking of daily progress of restoration and construction projects, such as; online posting of updates, timeline, project reporting, uploading of documents, and photos; and subsequently synchronizing these data items as data feed in a real-time process from a WordPress platform website to multiple mobile devices. Through a web to app connectivity technology (hereinafter "SyncMeIn"), all data posted to the website will be synchronized across multiple mobile devices through the mobile application. Property owners or users will gain real-time visibility into the whole process of restoration projects and can receive immediate notification every time a new update was posted by the Administrator and convenient access to digital images and digital document files associated with the progress of a particular project.

For example, remotely located property owners desire the ability to receive immediate and convenient access to digital images depicting the progress of a restoration project being conducted on the owner's property. In the prior art, the system and method may include 1) the property owner calling the project manager for status, and 2) the project manager providing status in the form of verbal communications and possibly taking pictures of the construction project and texting or emailing the pictures to the property owner's smartphone and/or email account. However, this process is inconvenient, unsecured, ineffective and time-consuming for the project managers, general contractors and the property owners.

Thus, there exists a need for a more effective method for general contractors, or disaster restoration companies to share project updates, photos and progress reports with property owners throughout the progression of the project. This communication barrier can best be remedied by sharing, in real-time, visibility into the whole process of the restoration project, through a web-based progress reporting system ("SyncMeIn") and a corresponding mobile application (hereinafter "app").

Therefore, a need exists to overcome the problems with the prior art as discussed above.

SUMMARY OF THE INVENTION

The invention provides a progress tracking system and method that overcomes the hereinafore-mentioned disadvantages of the heretofore-known devices and methods of this general type.

With the foregoing and other objects in view, there is provided, in accordance with the invention, a method for synchronization and notification of any online posting and/or uploading of data by an administrator to a computer running a website to a mobile device of a particular user without the need of an external push notification service comprises the steps of using a web-to-app connectivity technology to directly synchronize the posting and the data to the mobile device of the particular user and using the web-to-app connectivity technology to directly sent a notification to the particular user when a new posting or new uploading of data associated with that particular user was posted or uploaded.

In accordance with another feature, an embodiment of the present invention includes a method that includes the steps of providing a software application operable on a plurality of electronic mobile devices and providing at least one plug-in for installation on a website associated with the software application, wherein the at least one plug-in is operably configured to provide a direct communication link between the website and each of the plurality of electronic mobile devices on which the software application is installed such that when project information is updated at the website, automatic and immediate synchronization of data feed and notifications can be sent to the electronic mobile device associated with the project information via the direct communication link.

In accordance with another feature, an embodiment of the present invention includes a system for synchronization and notification of any online posting and/or uploading of data by an administrator to a computer running a website to a mobile device of a particular user without the need of an external push notification service, including a web-to-app connectivity technology/protocol that directly synchronizes the posting and/or the data to the mobile device of the particular user and using the web-to-app connectivity technology/protocol to directly send a notification to the mobile device of the particular user when a new posting or new uploading of data associated with that particular user was posted or uploaded.

Although the invention is illustrated and described herein as embodied in a progress tracking system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 2-9 show screenshot of the "SynchMeIn" dashboard.

FIGS. 4-9 show screenshots of the "SynchMeIn" dashboard for adding a new post.

FIGS. 10-27 show various screenshots of the "Disaster Restoration" app.

FIG. 33 shows a list of features for the "Disaster Restoration" restoration iOS app.

FIGS. 34-50 show screenshots of the "Disaster Restoration" app.

FIGS. 51-61 show screenshots of the "GE Push Notification plugin".

Figure 65:
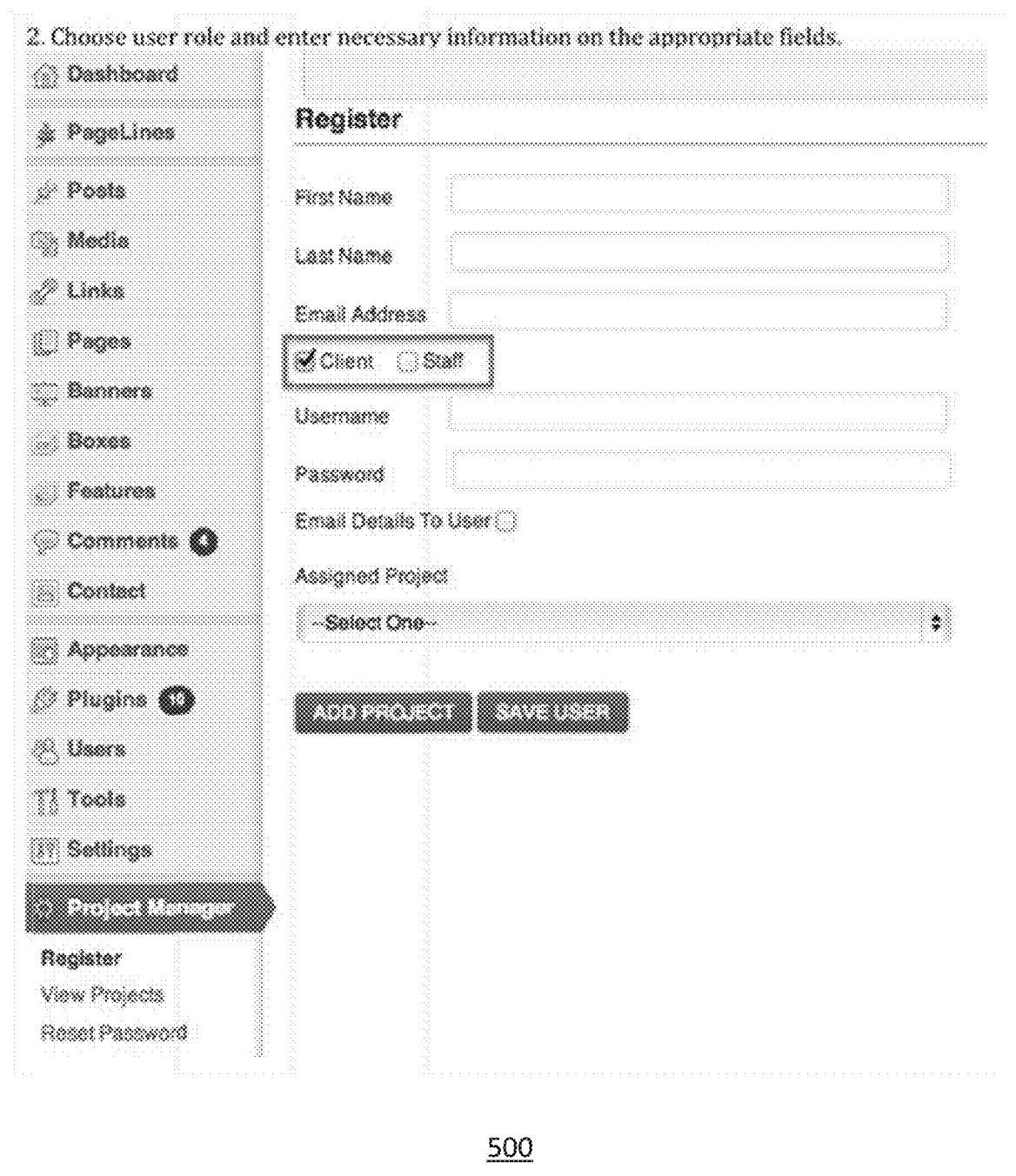

FIGS. 62-70 show screenshot of the "GE Project Manager Plugin".

DETAILED DESCRIPTION

Figure 1:
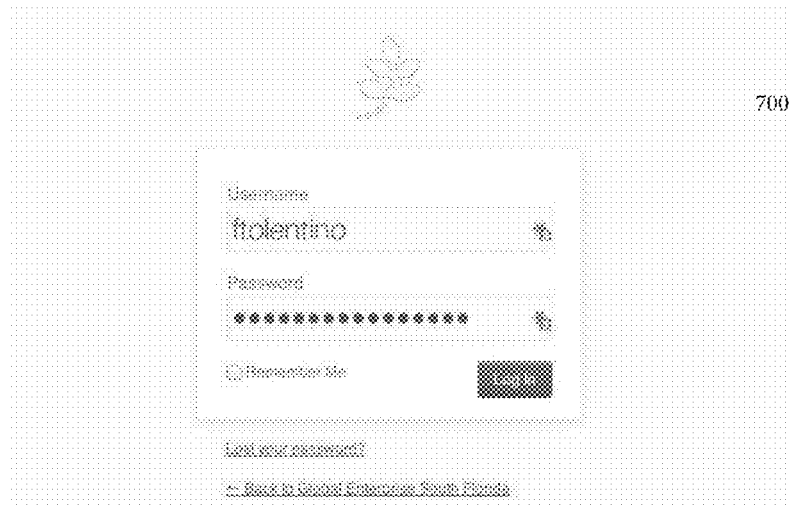
FIG. 1 shows a screenshot of the login screen of the "SyncMeIn" installed on a website.
Figure 2:
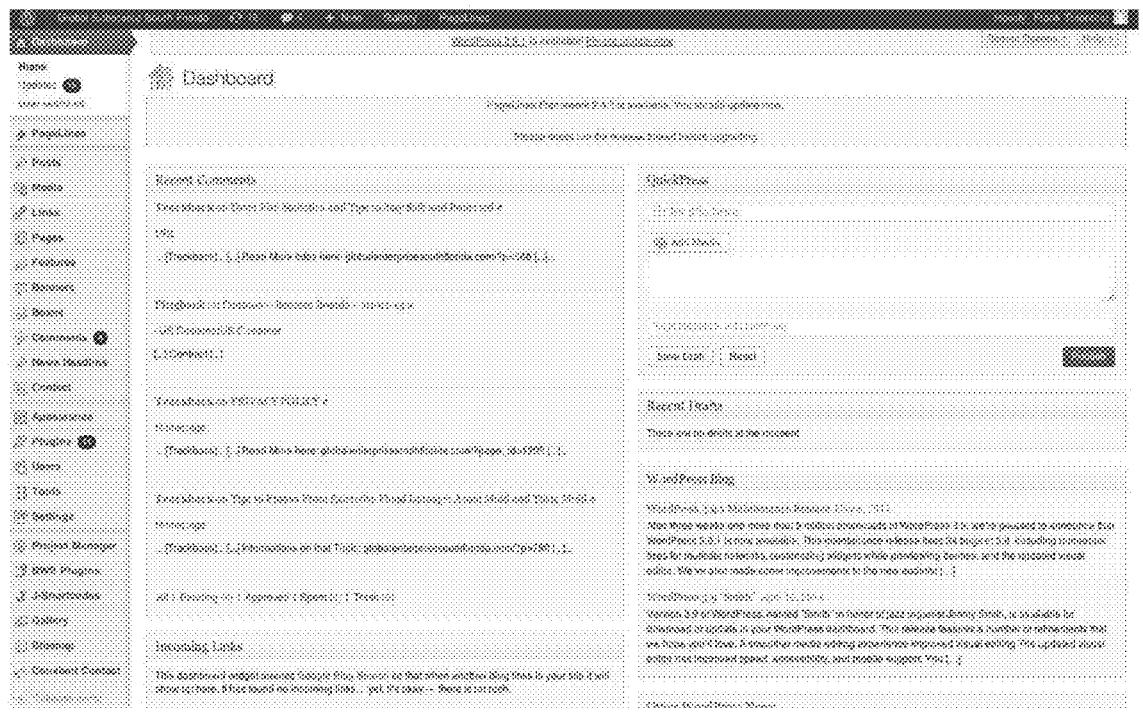
Figure 3:
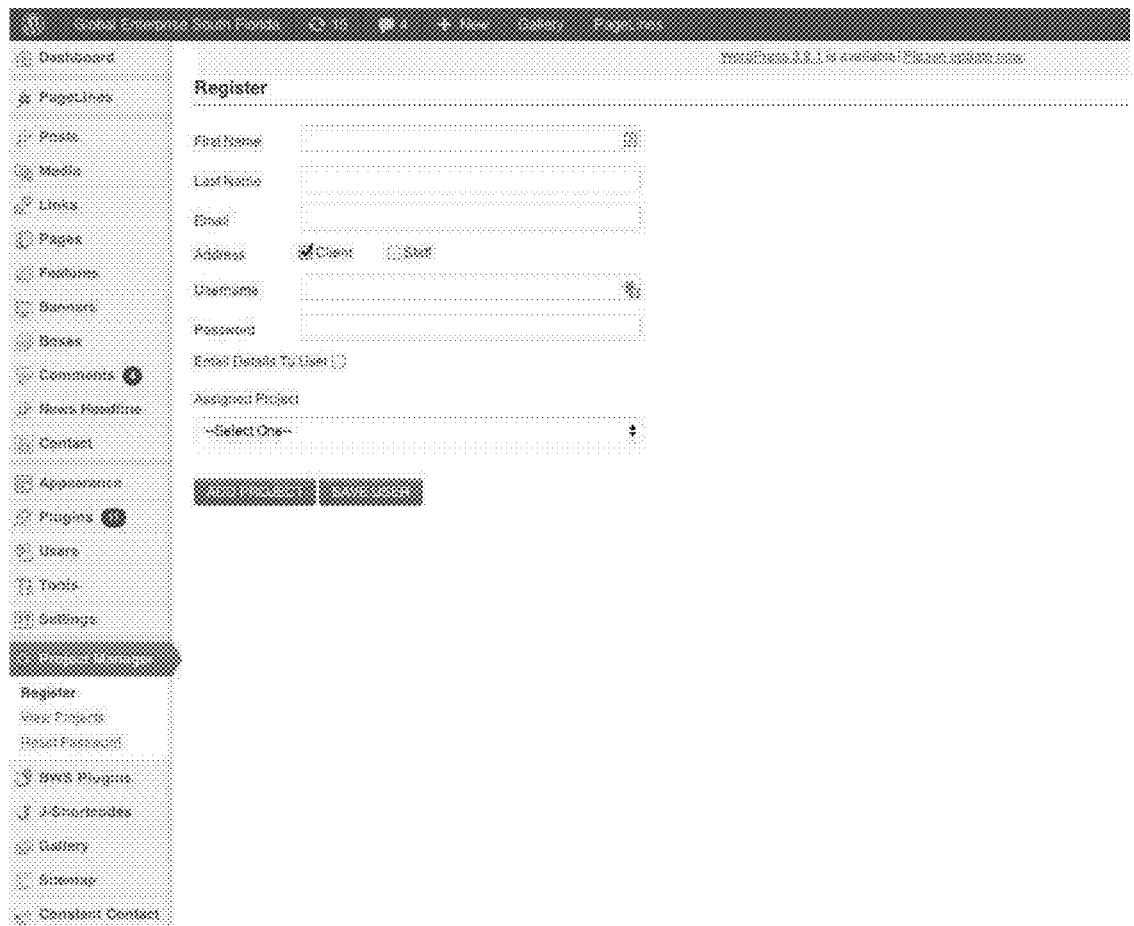
Figure 8:
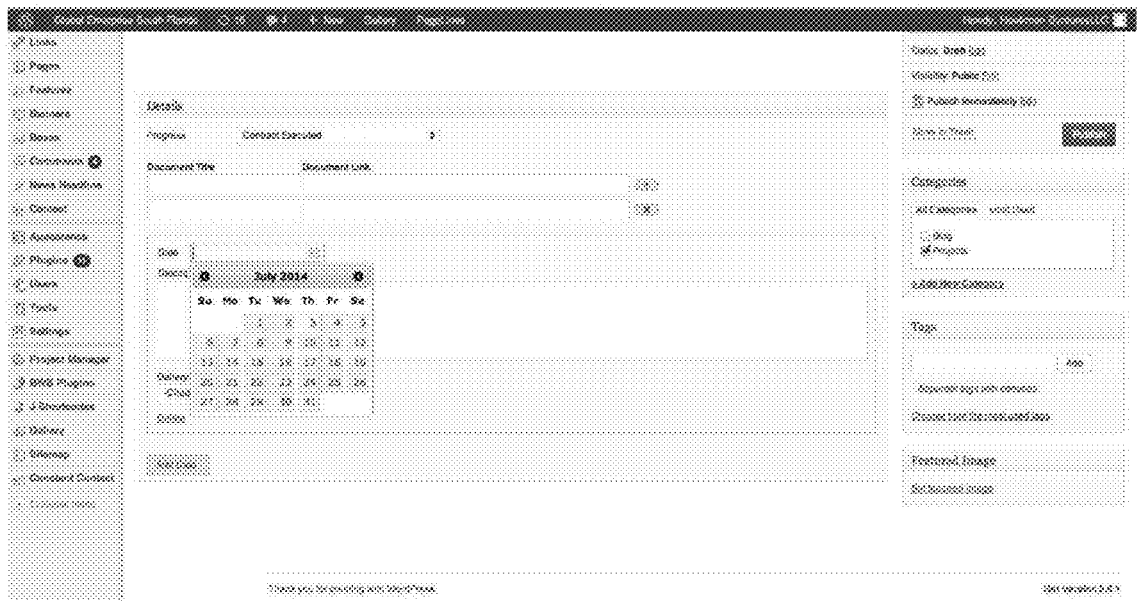
Figure 9:
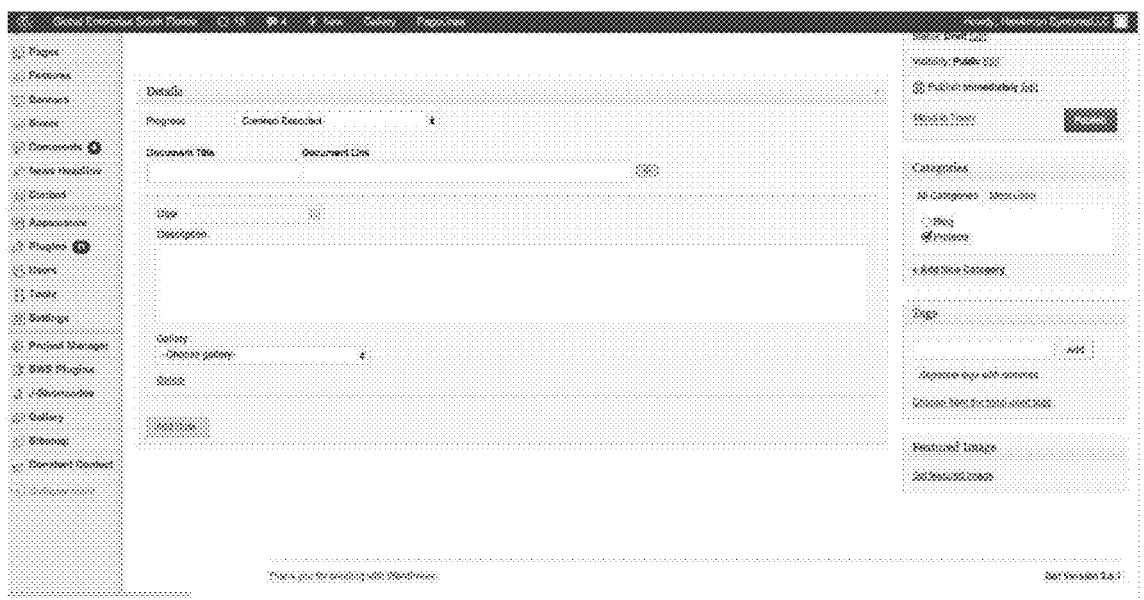

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient progress tracking system and method. Embodiments of the invention provide immediate updates to users of remote networked mobile devices. In addition, embodiments of the invention provide a system where updates to a website are pushed without delay, i.e., without requiring the prior-art pass through of a Push Notification Service, to the users of the mobile devices.

Figure 71:
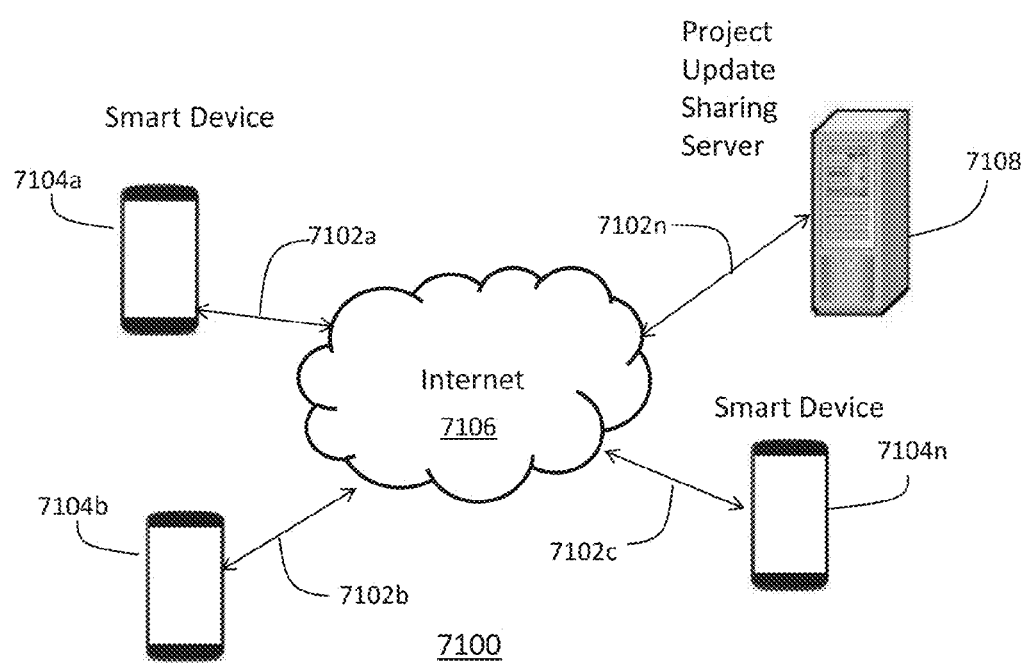
FIG. 71 is a block diagram of an exemplary network in accordance with an exemplary embodiment of the present invention.

Referring first to FIG. 71, an exemplary embodiment of a network 7100, in accordance with the present invention, is illustrated in a block diagram. FIG. 71 shows several advantageous features of the present invention situated on the network 7100, but, as will be described below, the invention can be provided in other environments, combinations of features and components, and varying numbers and functions of the components.

The network 7100 includes connections 7102a-n, which are the medium used to provide communications links between various devices and computers connected together within the network 7100. The connections 7102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 7100 includes one or more mobile electronic devices 7104a-n and a project update sharing server system 7108, communicatively coupled to each other through the internet 7106. As will be described further herein, the project update sharing server system 7108 manages communications between client devices, such as the mobile electronic device 7104.

Other non-illustrated subnetworks may also be present in or connected to the network 7100 which further provide connective services to the networked devices 7104. In the depicted example, the network 7100 can include the Internet 7106, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 7100 also may be implemented as a number of different types of networks, such as for example, an Intranet, a LAN, a peer-to-peer network, or another WAN. FIG. 71 is intended as an example, and not as an architectural limitation for the present invention.

For convenience, the mobile electronic device 7104 will be referred to herein below as a smartphone. However, it should be understood that features of the invention may be carried out using other types of mobile electronic devices, such as, for example, computer tablets, personal digital assistants, music player devices, and the like. The smartphone 7104 may be used to run applications/programs that display data and provide information to the user in accordance with goals of the present invention. More particularly, the smartphone 7104 may include an audio output port for communicating an audio output signal associated with data changes on the server 7108. In one embodiment, the smartphone 7104 may include a user interface (e.g. touchscreen), a network interface including a cellular network interface, memory, a processor, audio input/output structures, and a location detection device (e.g. GPS receiver/transmitter).

In one embodiment, the mobile electronic device 7104 may include a wireless network interface, such as a Wi-fi network or a Bluetooth network interface so as to be able to connect to other devices wirelessly. In yet a further embodiment, the Wi-fi network may be operable to connect to the project update sharing server system 7108 wirelessly via the Internet 7106.

In operation, a first mobile electronic device 7104*a* transmits content, i.e., pictures, sound, documents, etc., in real-time to the project update sharing server system 7108 over the Internet 7106 and the project update sharing server system 7108 determines what remote audio receiver devices to synchronously share the content with. In a further embodiment, individuals associated with the remote audio receiver devices are required to provide payment to the project update sharing server system 7108, or a third-party payment service, in order to receive permissions to synchronously receive content in real-time.

The accompanying figures serve to illustrate various embodiments and explain various principles and advantages all in accordance with the present invention.

FIGS. 1-9 (screenshots 700-708) illustrate the SyncMeIn web Dashboard when installed to a WordPress website. This is where the Administrator or Project Manager logs-in and add a project to manage and monitor (see screenshots 701-703). He inputs the client's name, email, address, username, password, and assigns the property that that profile is associated with. Here there is an option to make the User profile as a Client of the restoration/construction company or a Staff of the restoration/construction company. Client privileges are set on view only, while the Staff privileges are set to manage and edit everything that has to do with the project.

FIGS. 4-9 (screenshots 703-709) illustrate where the Staff would input all the posts and add any relevant documents along with the details and progress reports. It is in this section that the Staff would be able to upload photos or a gallery of photos taken at the actual job site. This is the section where the Staff can provide a brief description of work associated with the corresponding photos, update the progress bar, link documents, set the date for when the updates were based on, and provide update notifications. Included is an exemplary progress tracking system in accordance with an embodiment of the present invention.

Figure 10:

FIG. 10 (screenshot 709) illustrates a mobile device software application, showing the home page of the app. In the event of a property emergency, whether it is caused by fire, mold, storm, smoke, water intrusion, or other property damage, this page provides easy icons to tap to automatically call emergency response units. Auto dial for other emergency government agencies related to property damage are also readily available on this page at a tap of an icon.

Figure 11:
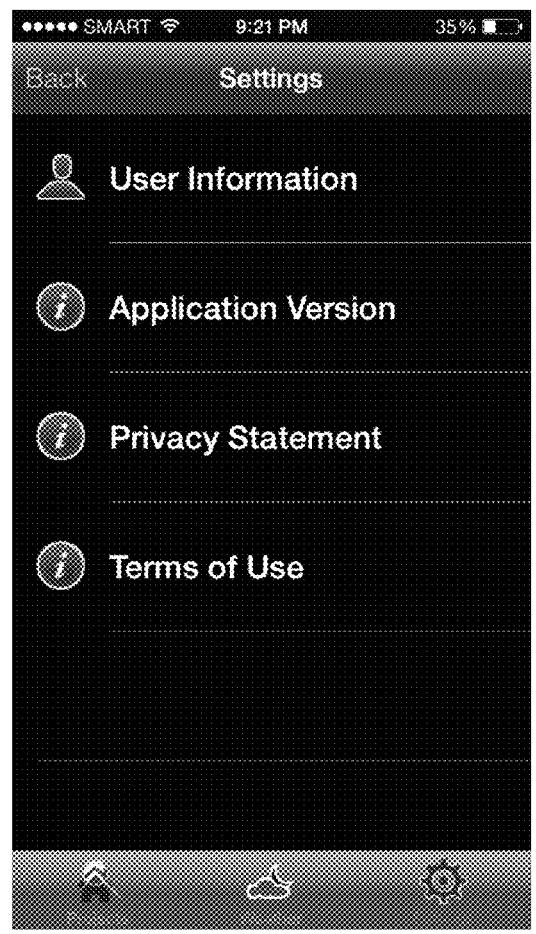
Figure 12:
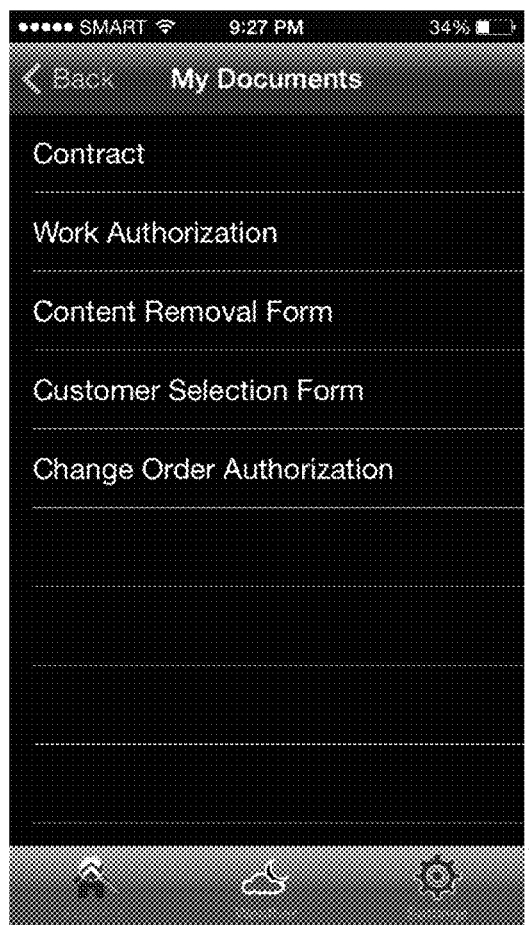
Figure 13:
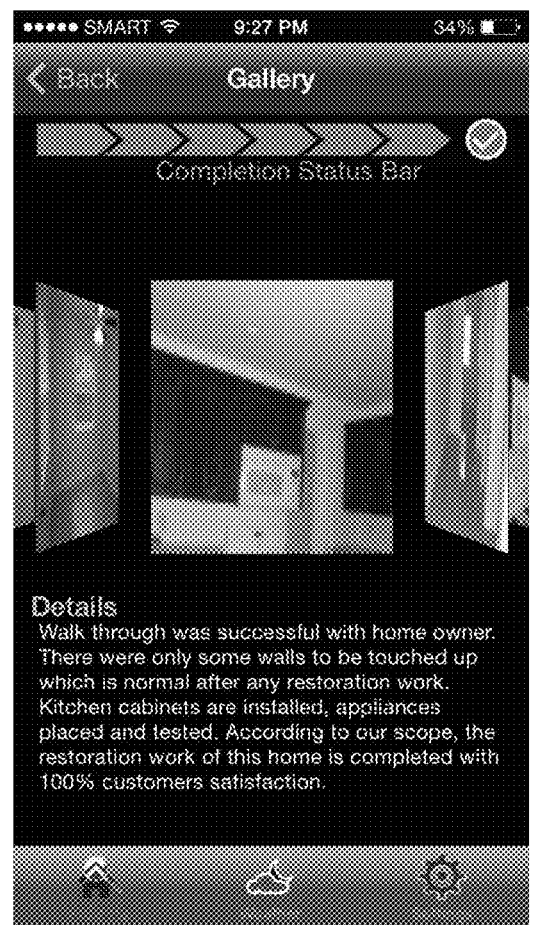
Figure 14:
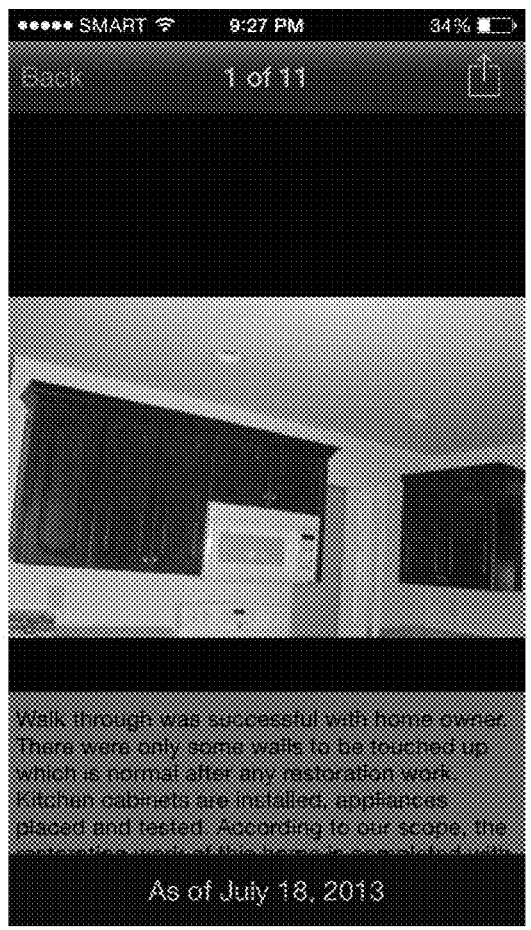
Figure 15:
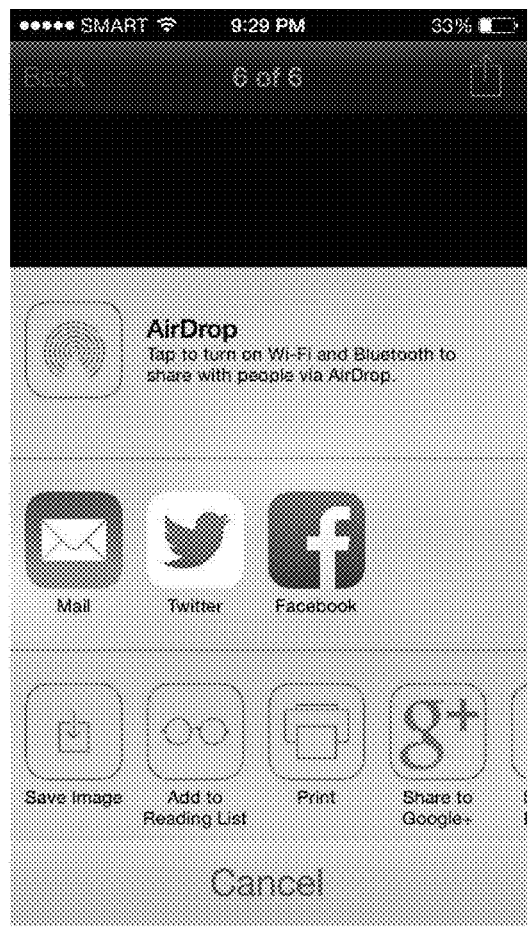
Figure 26:
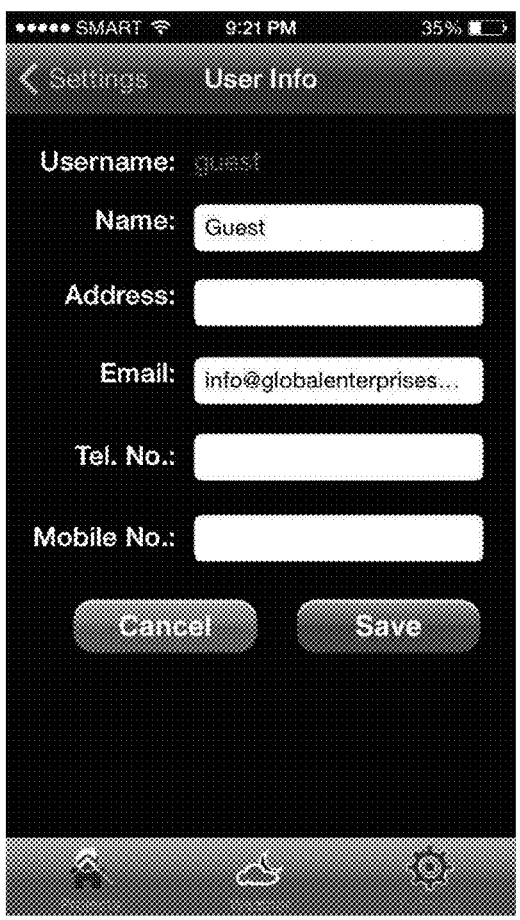
Figure 27:
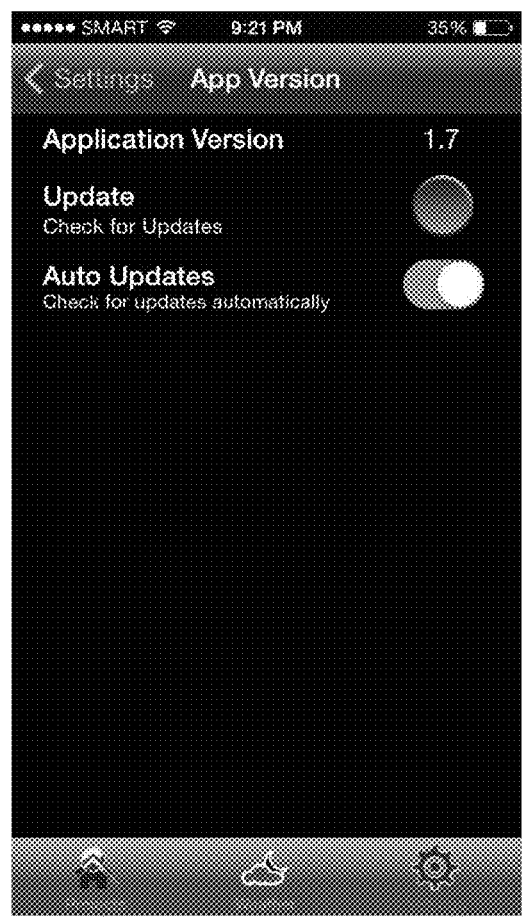
Figure 28:
FIGS. 28-32 show screenshots of the website with the "SynchMeIn" plugin.
Figure 29:
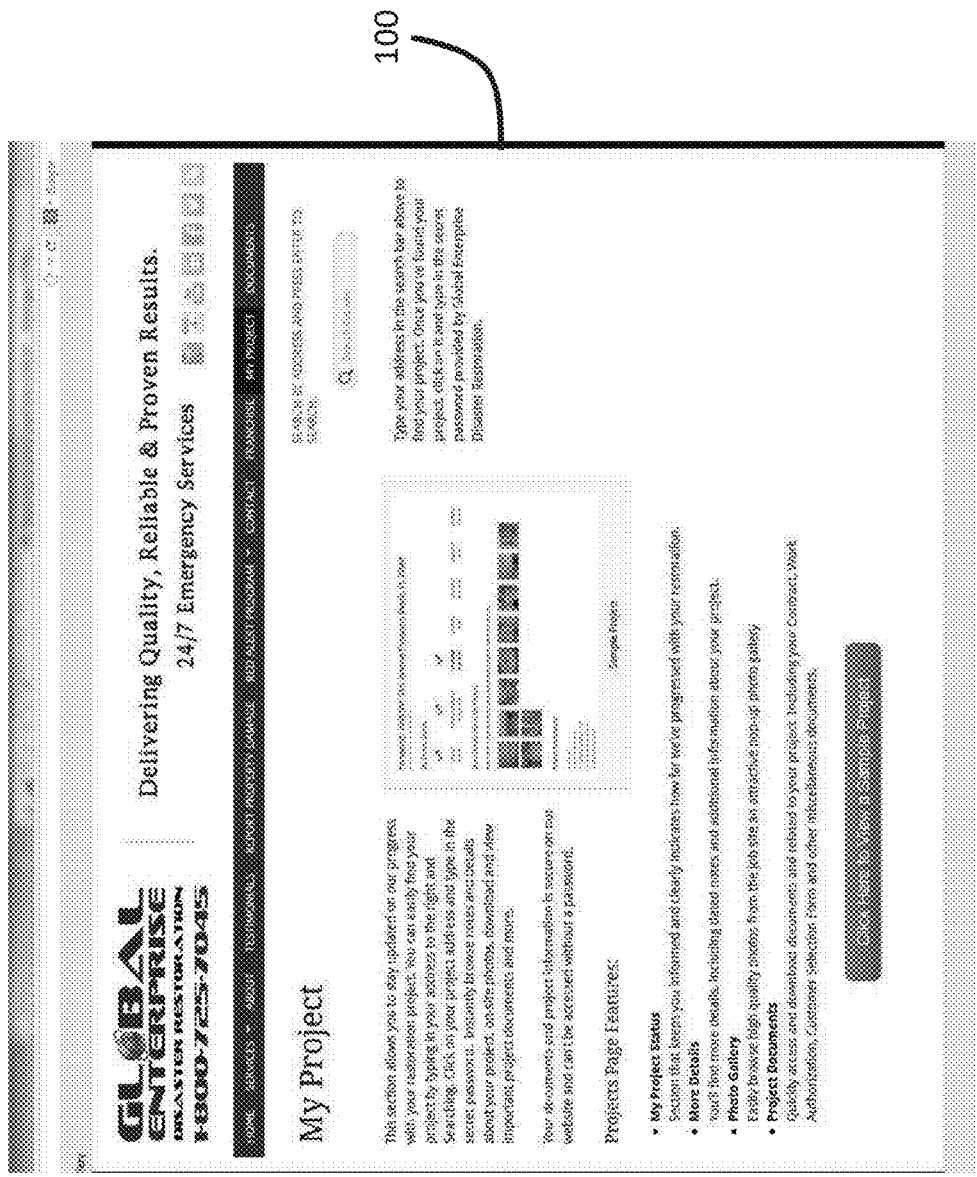
Figure 30:
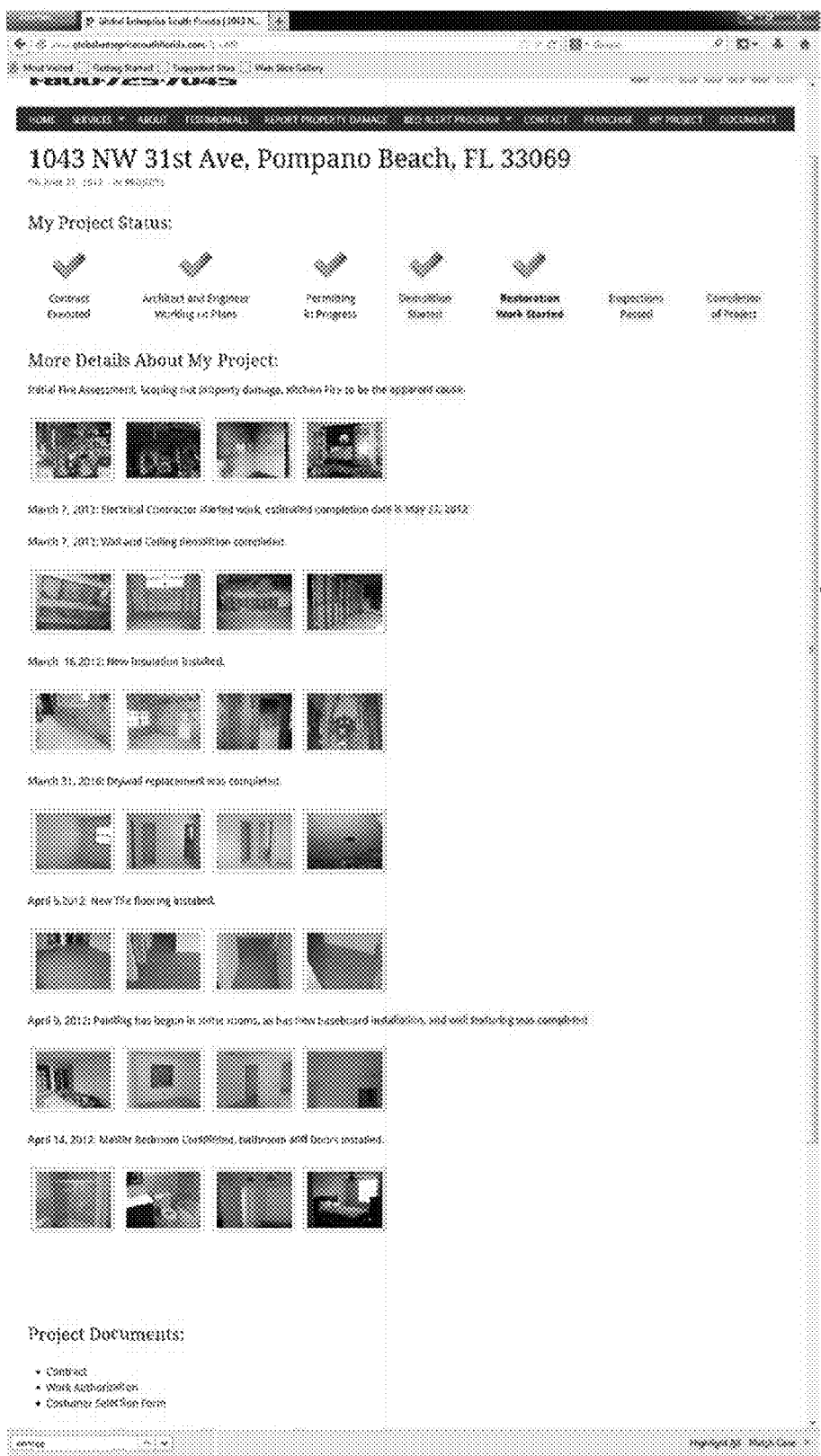
Figure 31:
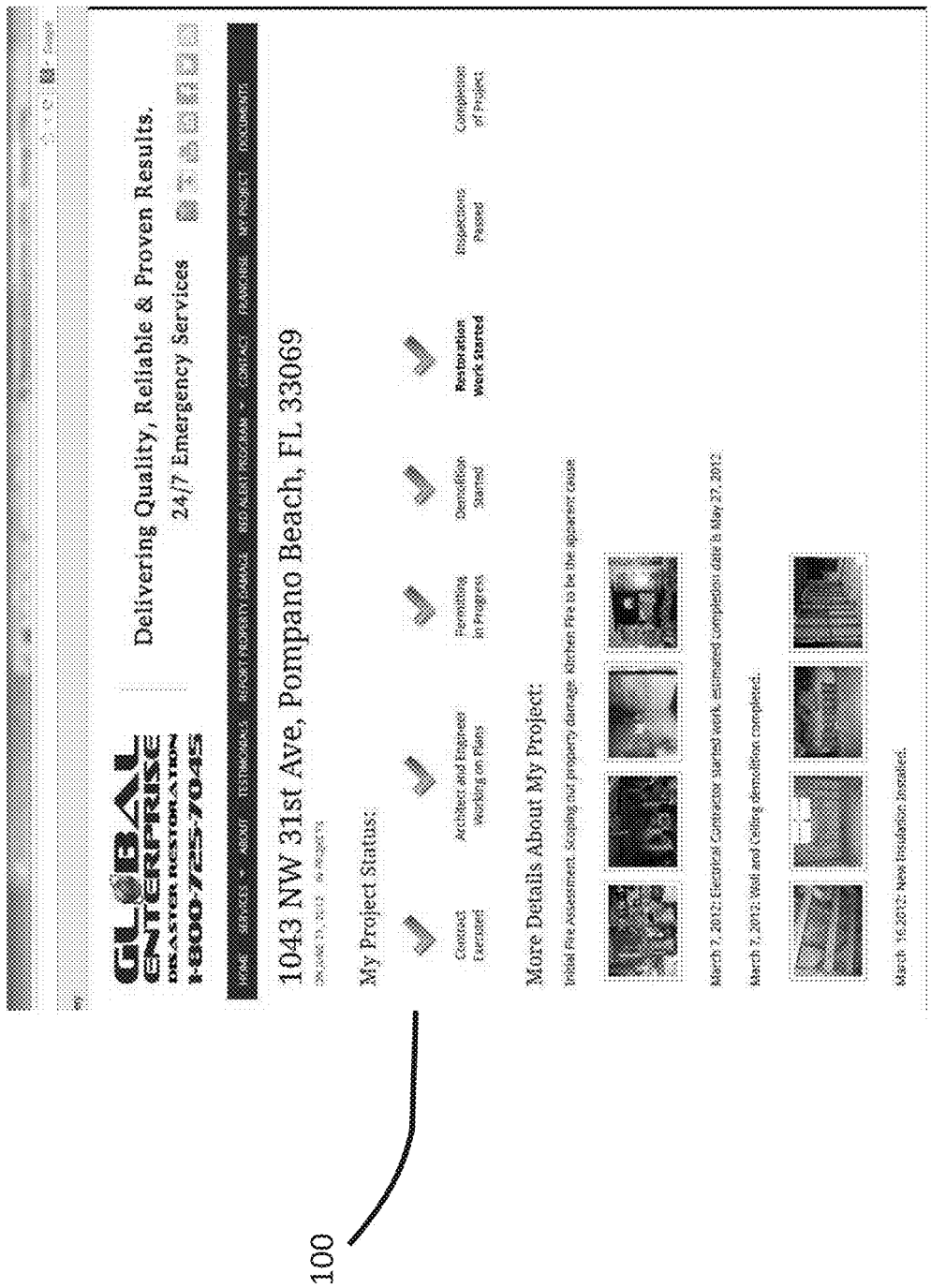
Figure 32:
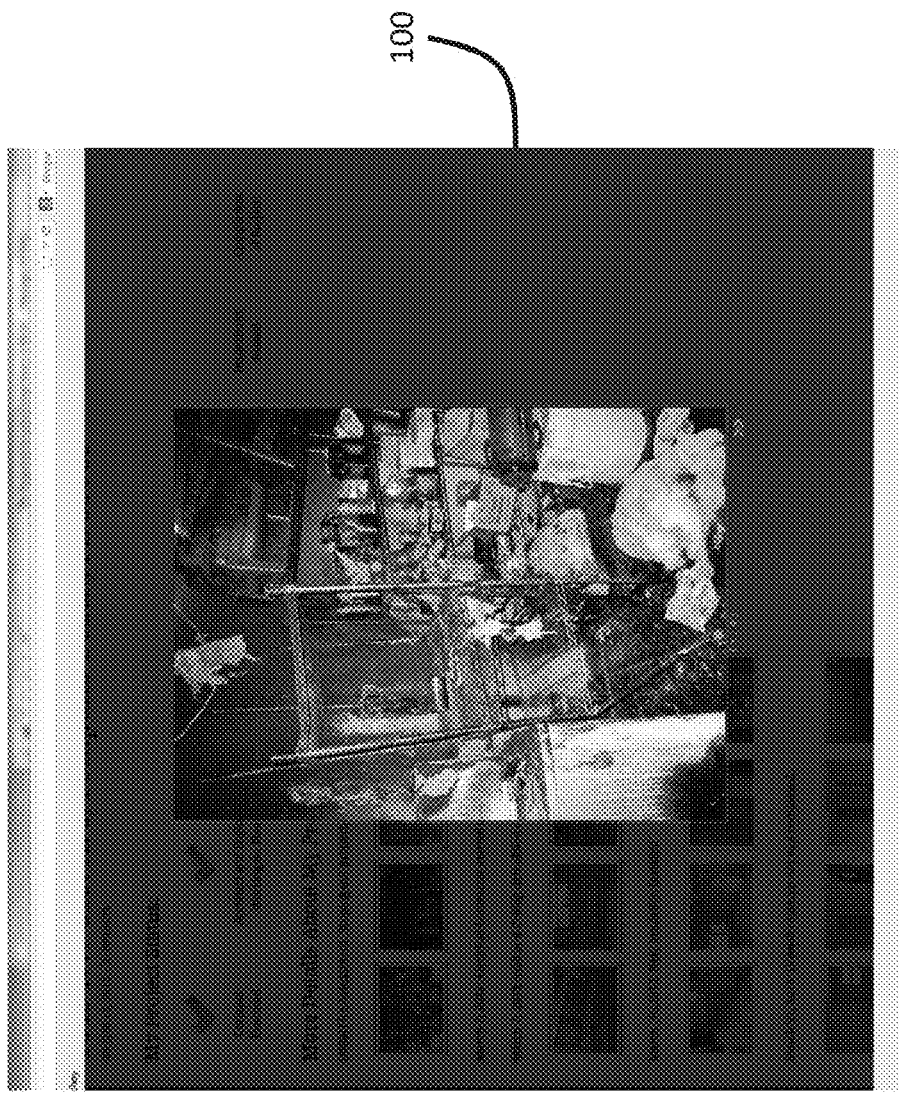
Figure 34:
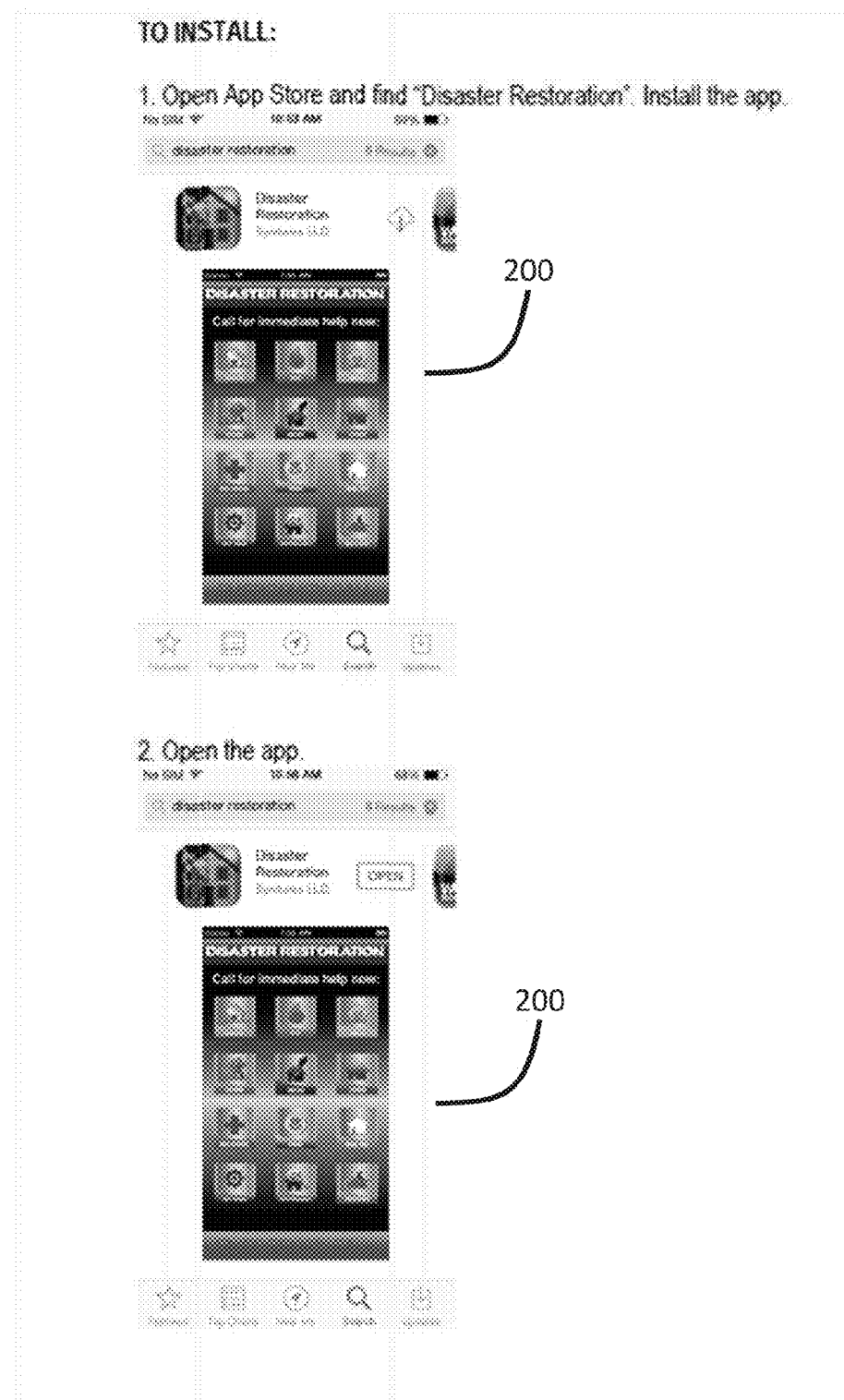
Figure 37:
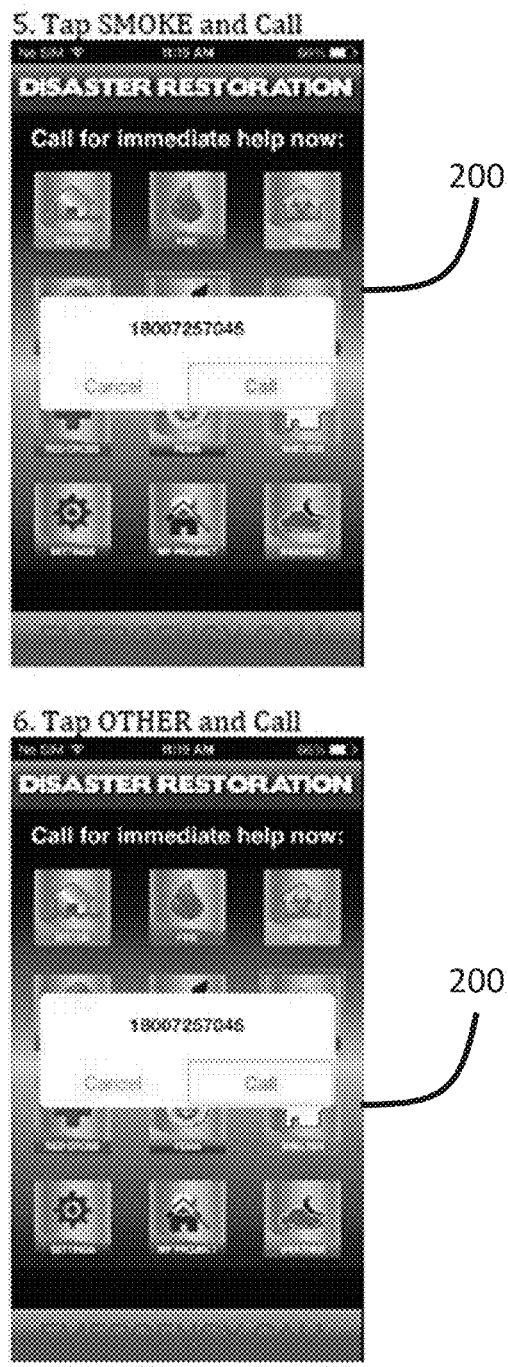
Figure 38:
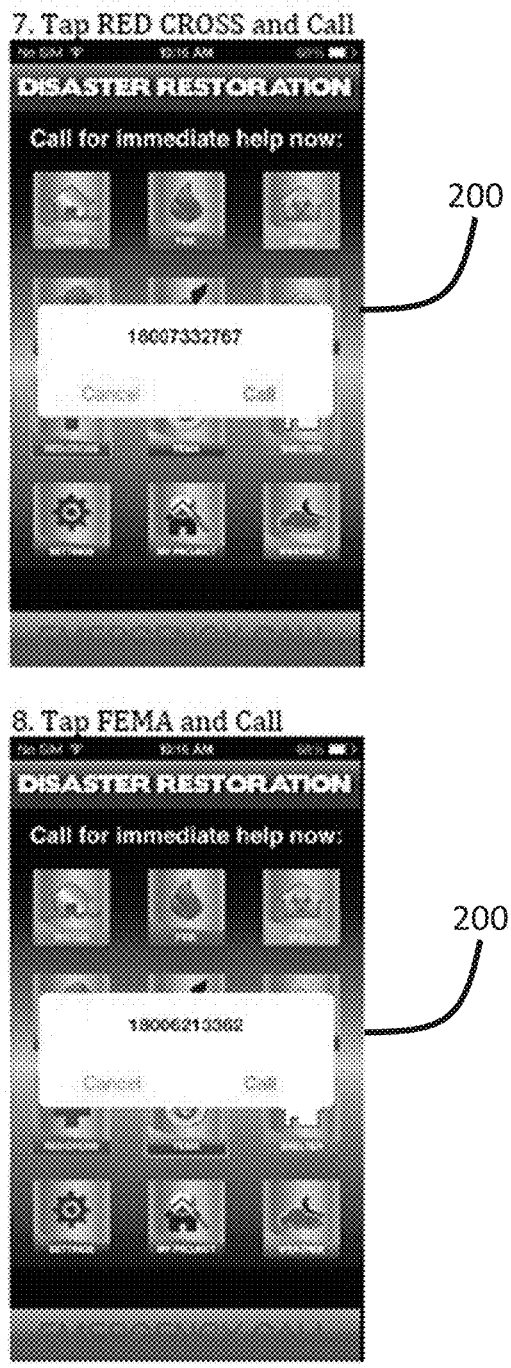
Figure 42:
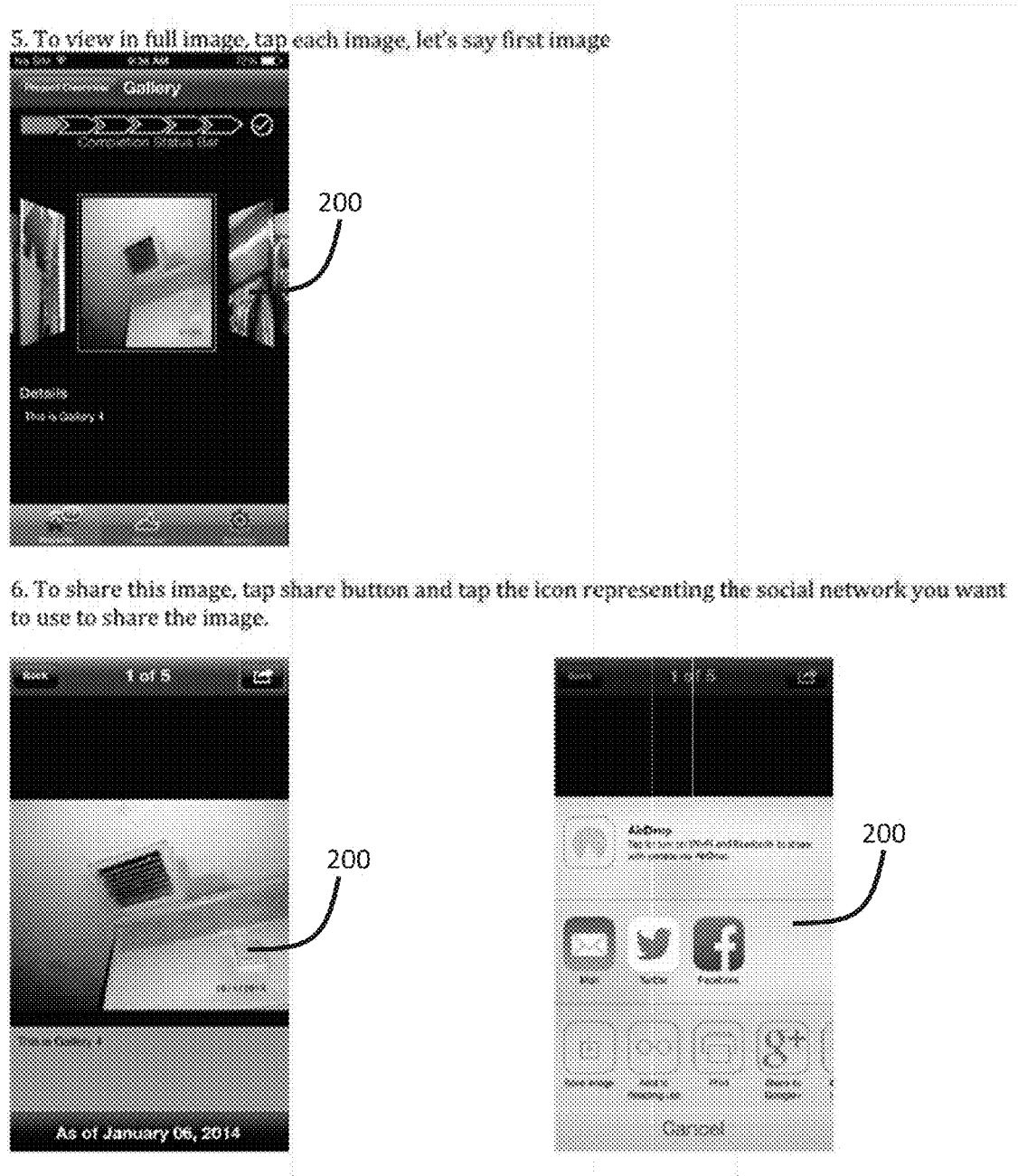
Figure 45:
Figure 46:
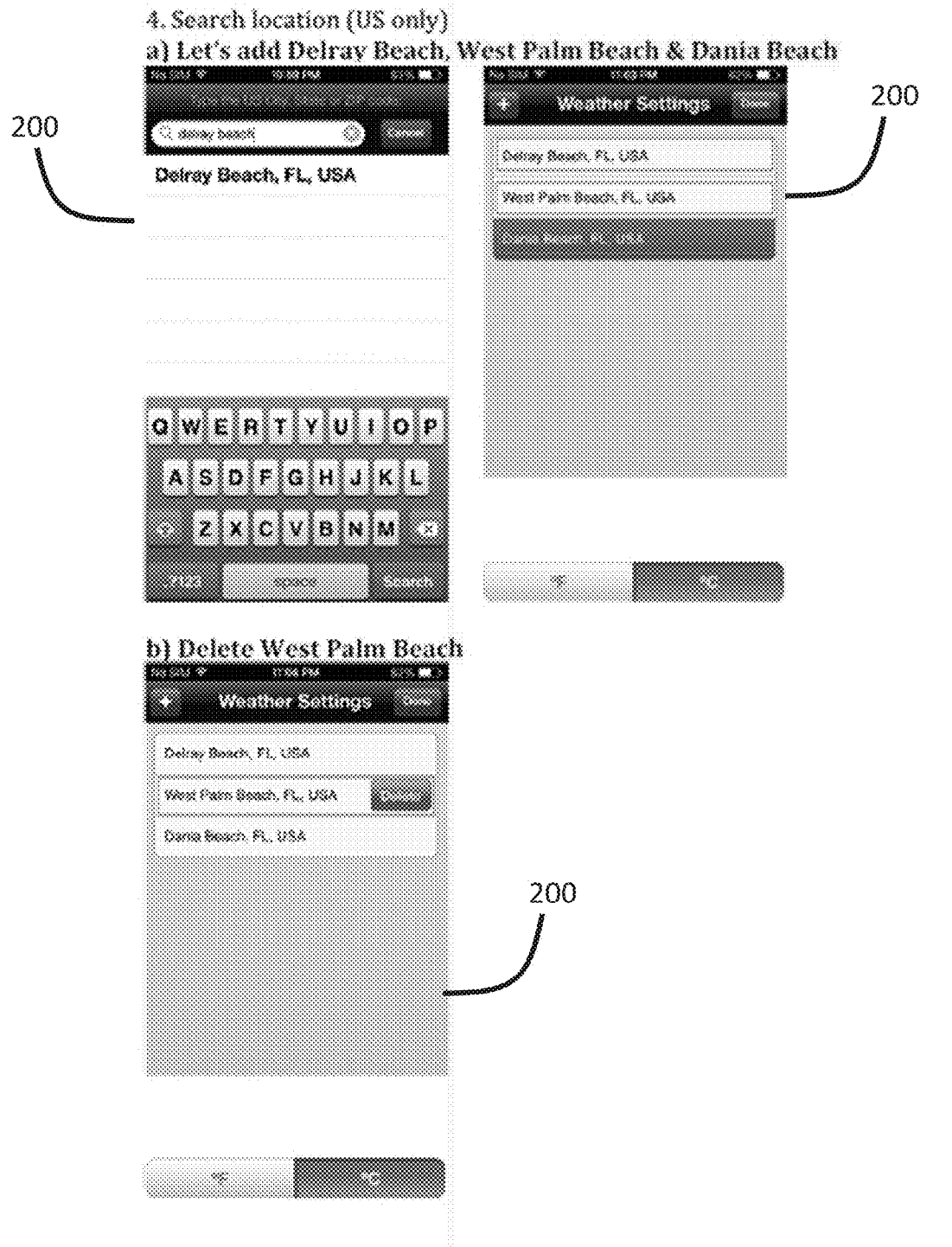
Figure 48:
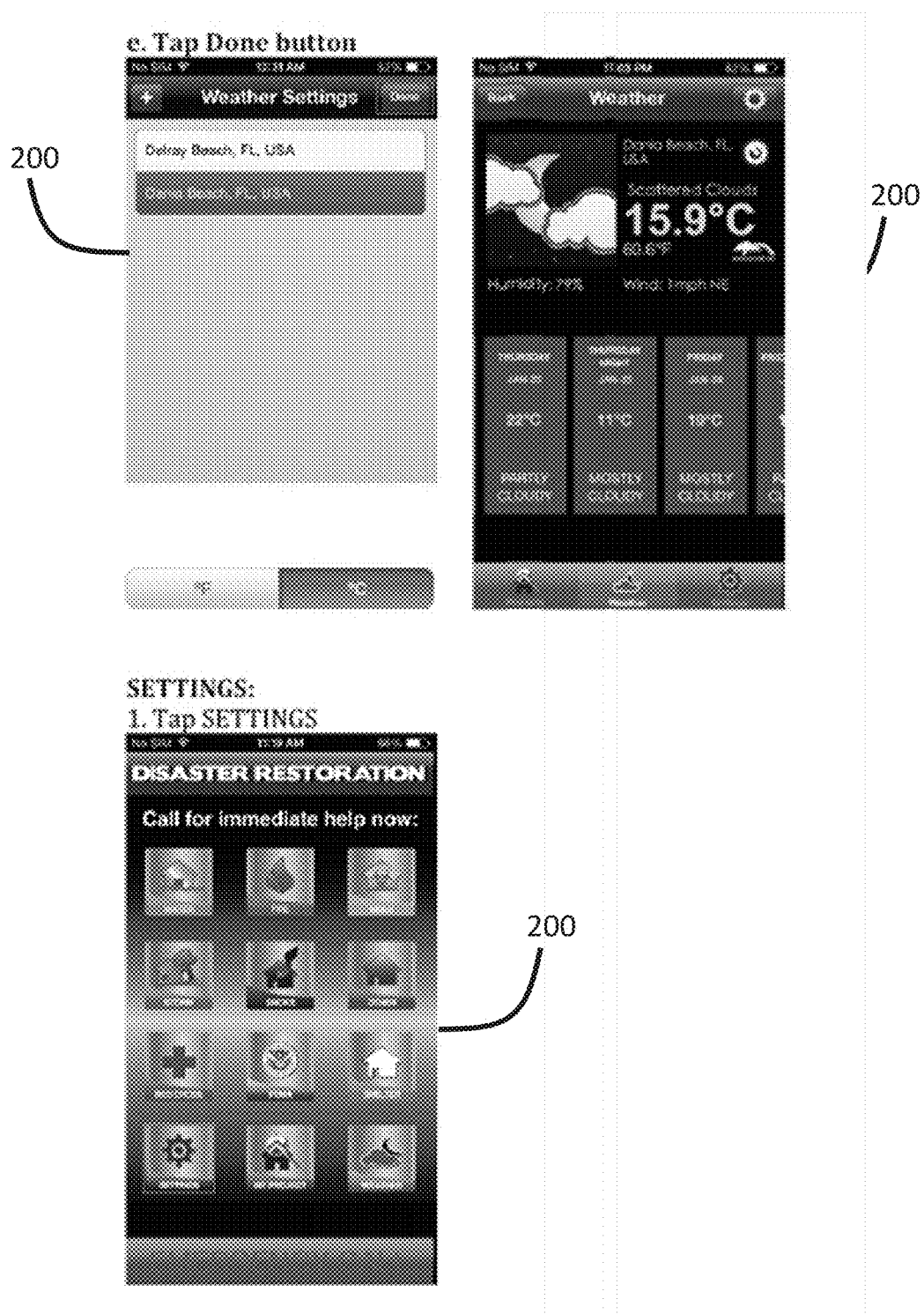
Figure 49:
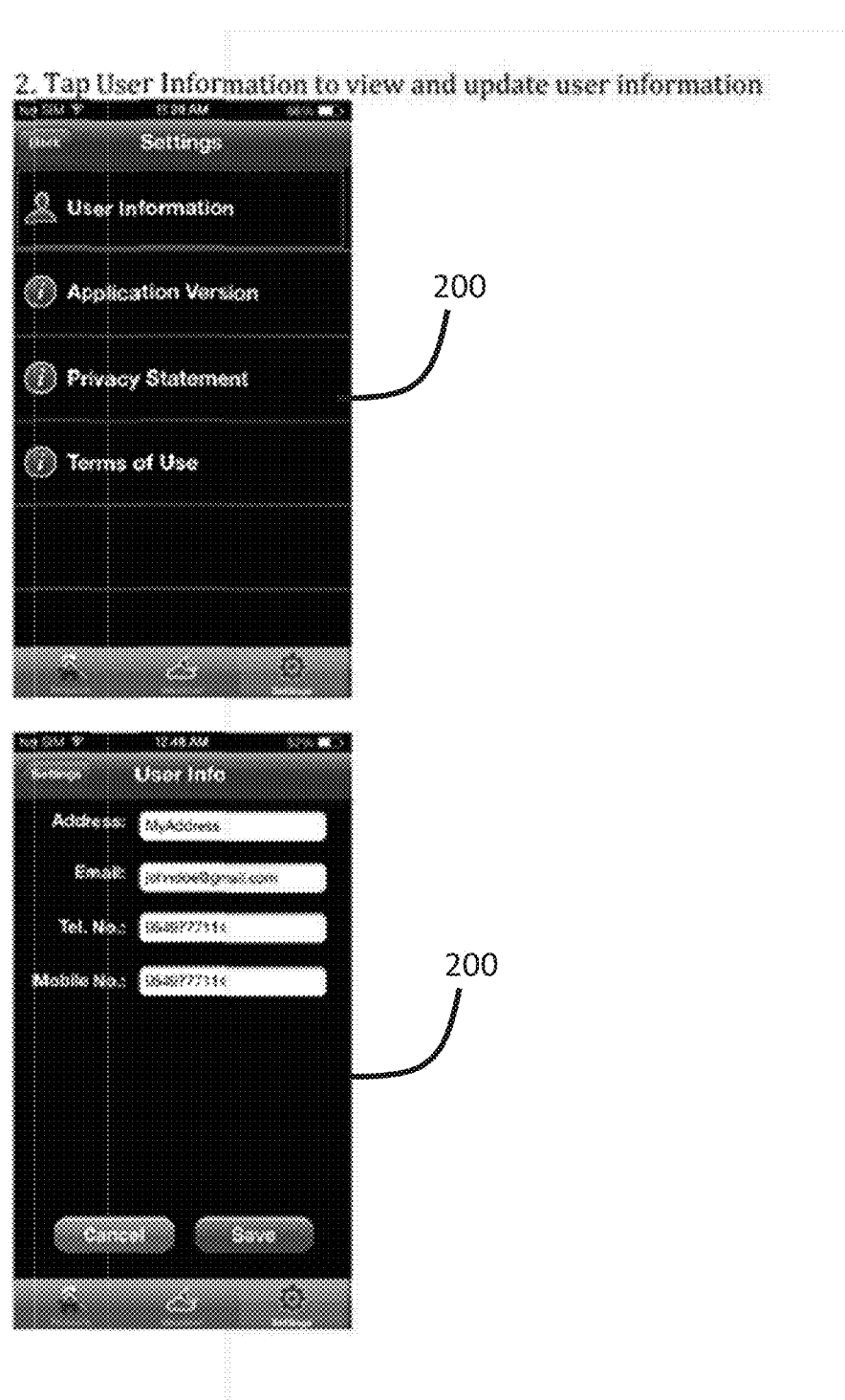
Figure 50:
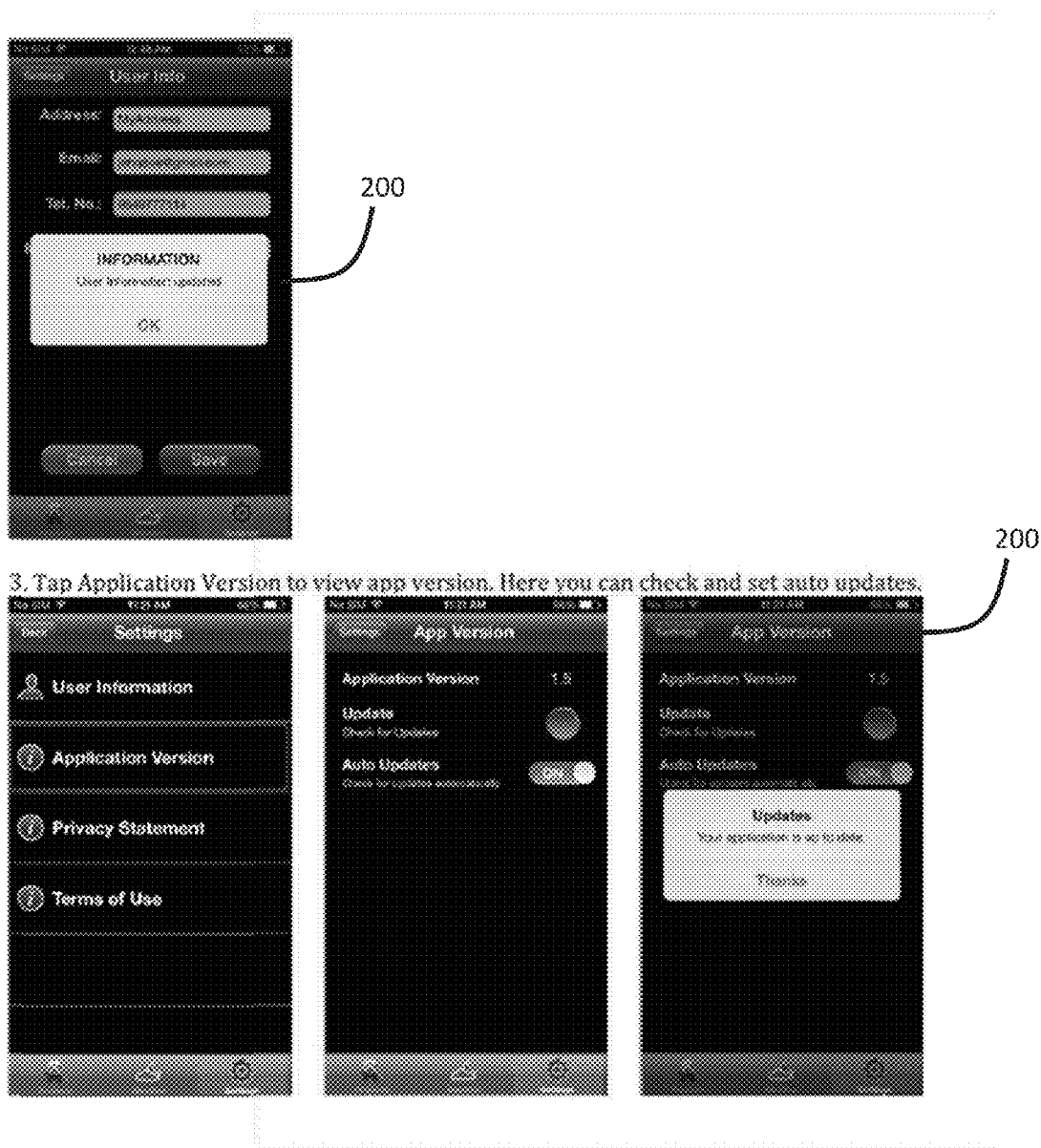
Figure 51:
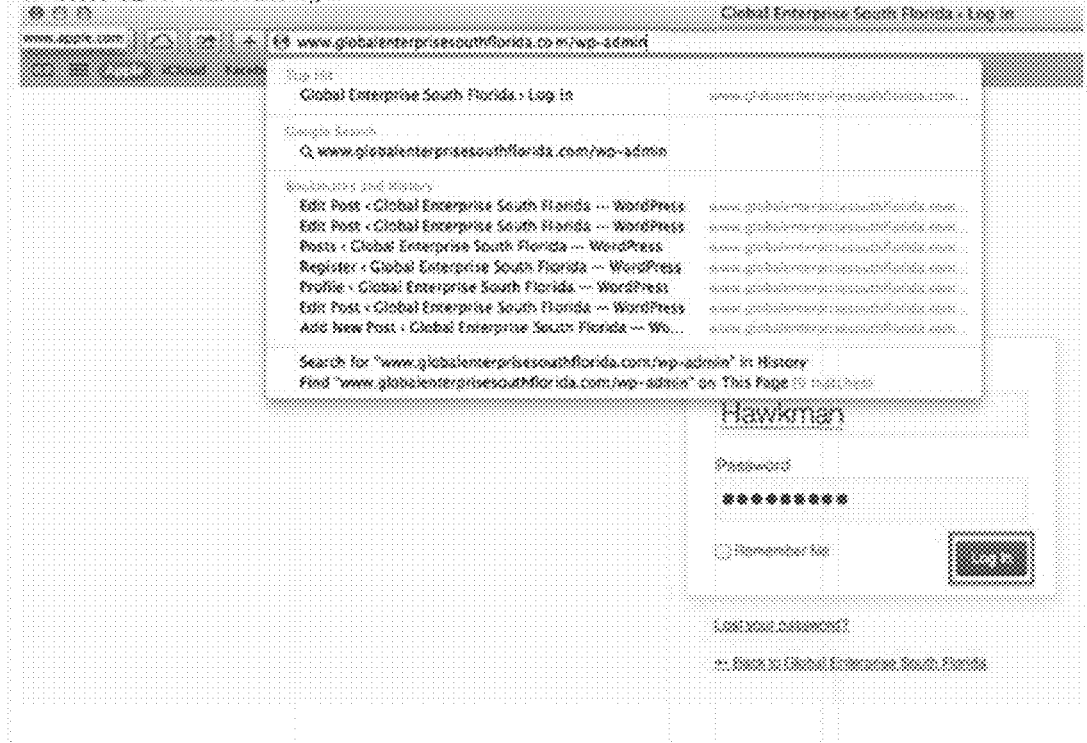
Figure 52:
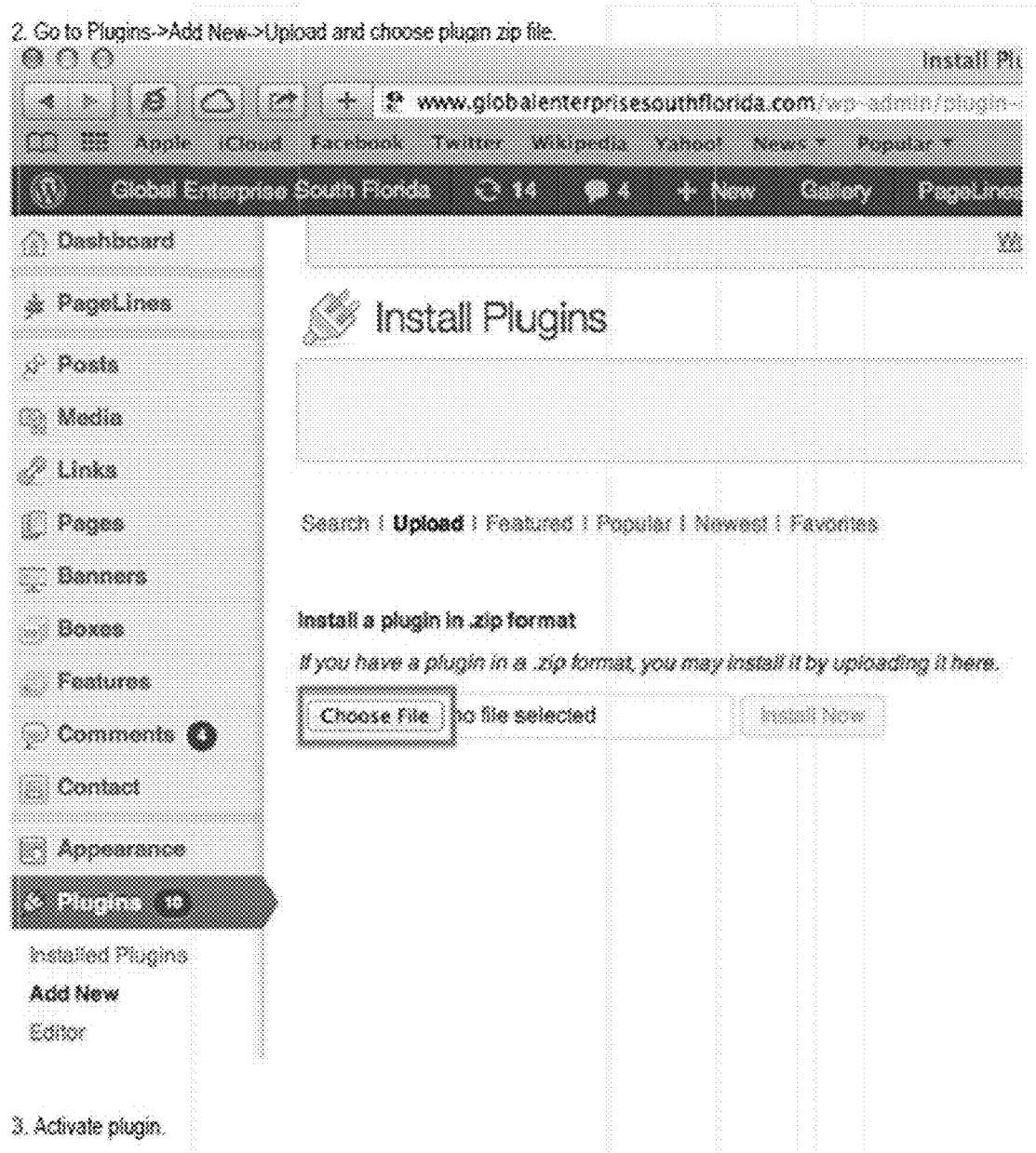
Figure 55:
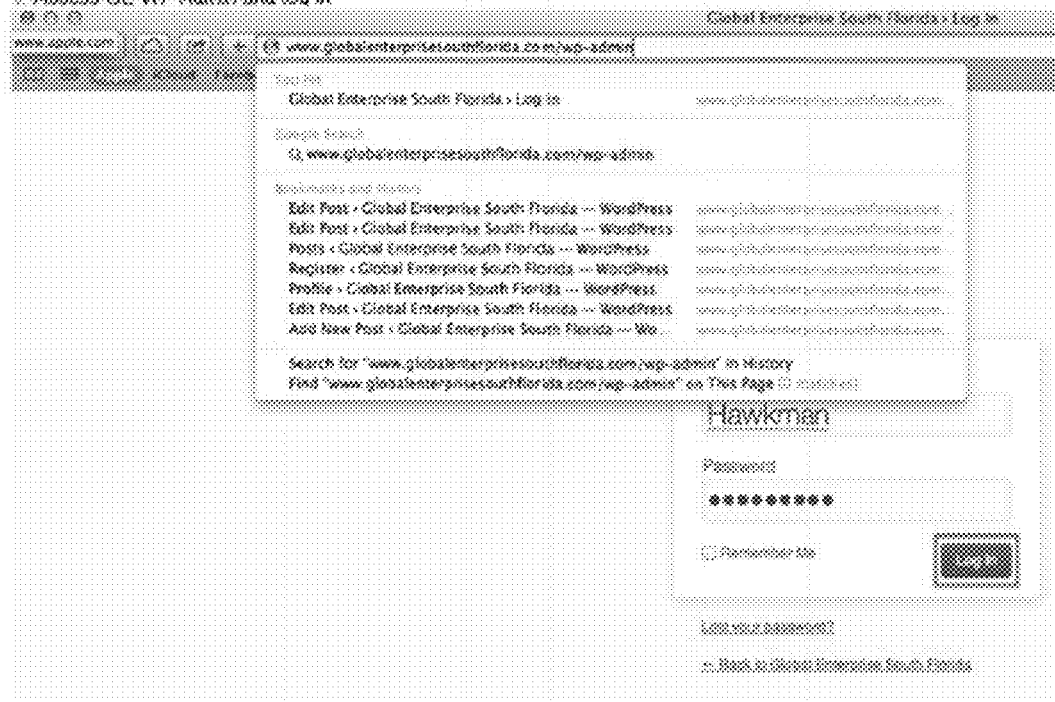
Figure 56:
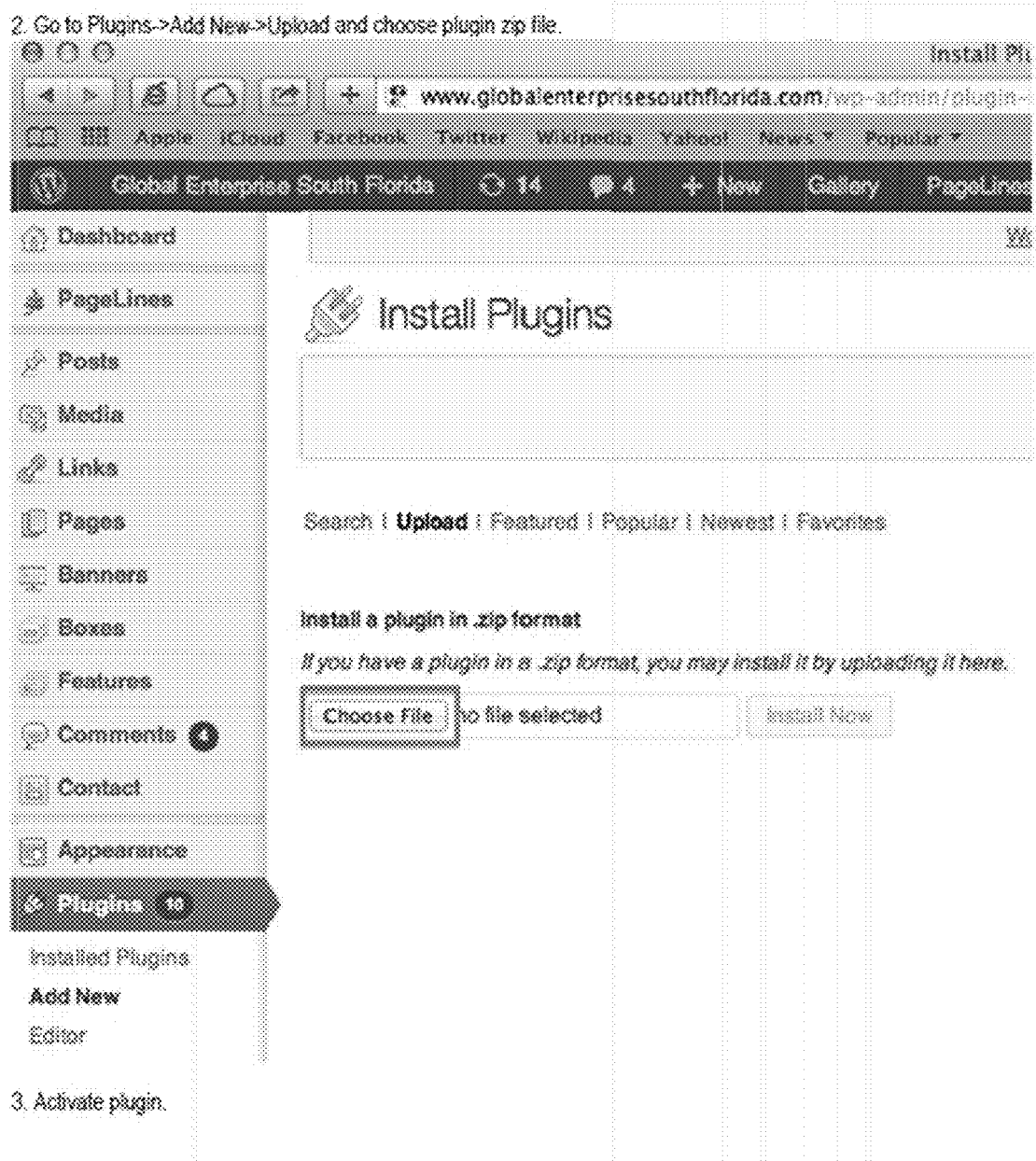
Figure 62:
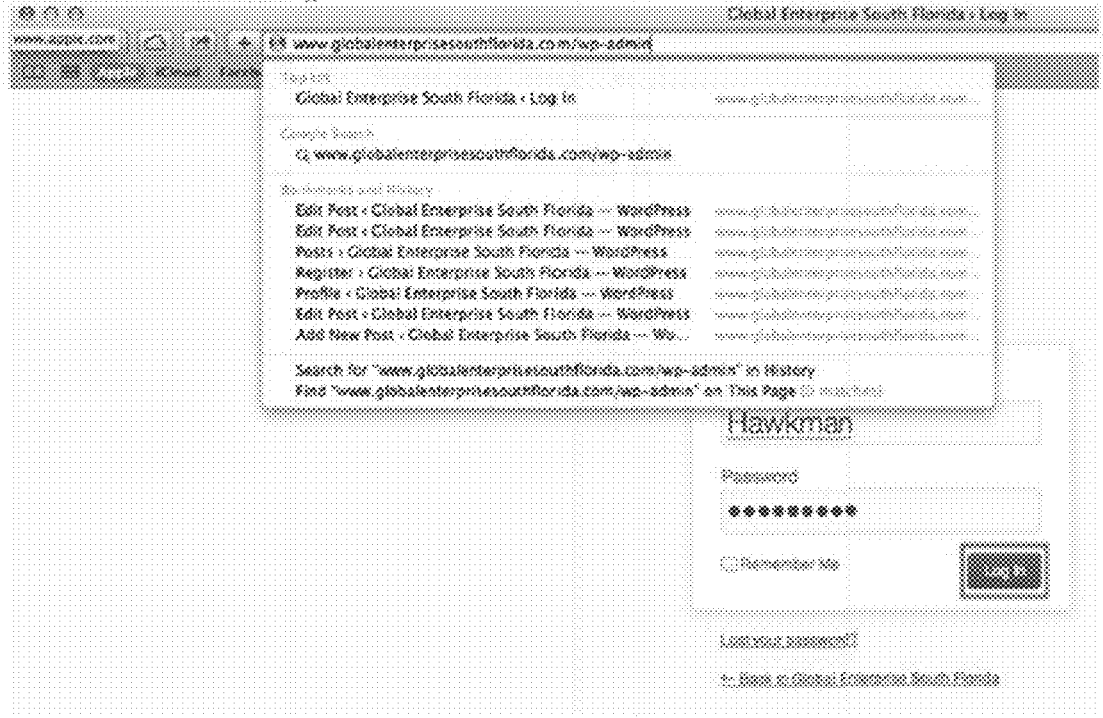
Figure 63:
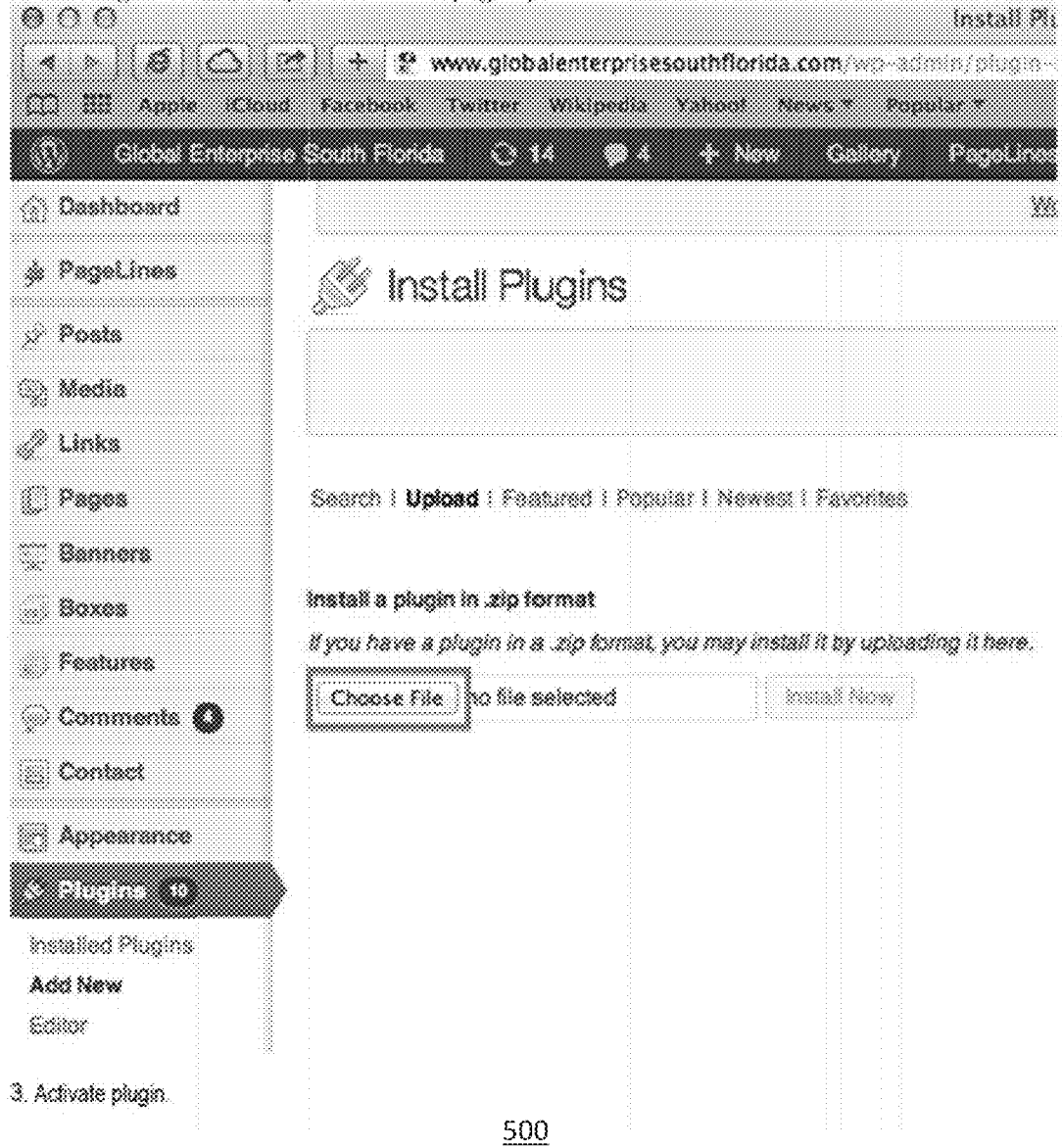
Figure 64:
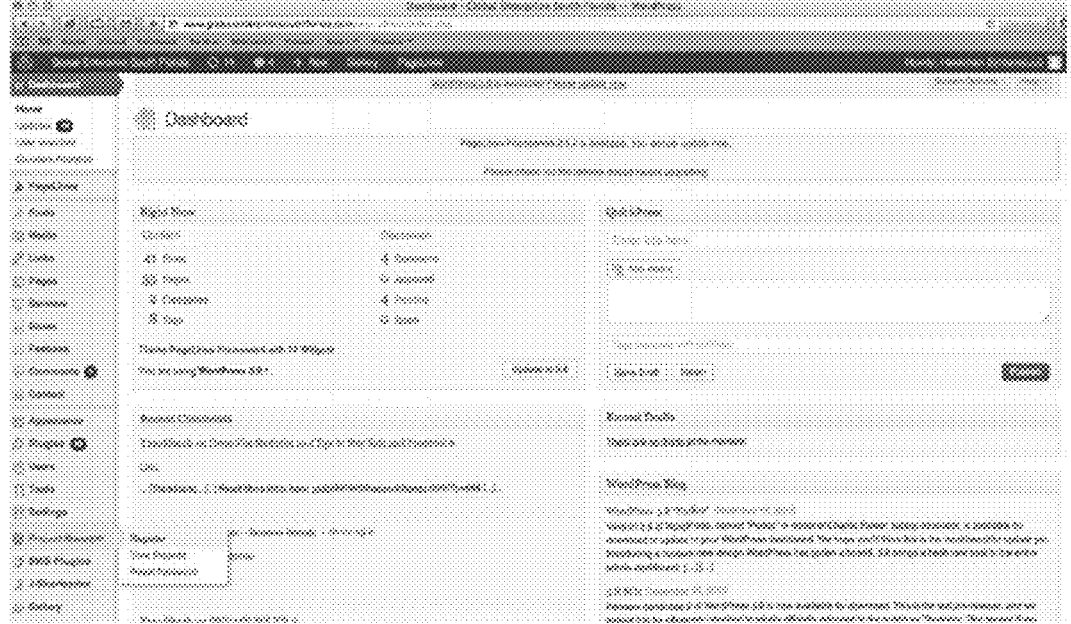
Figure 67:
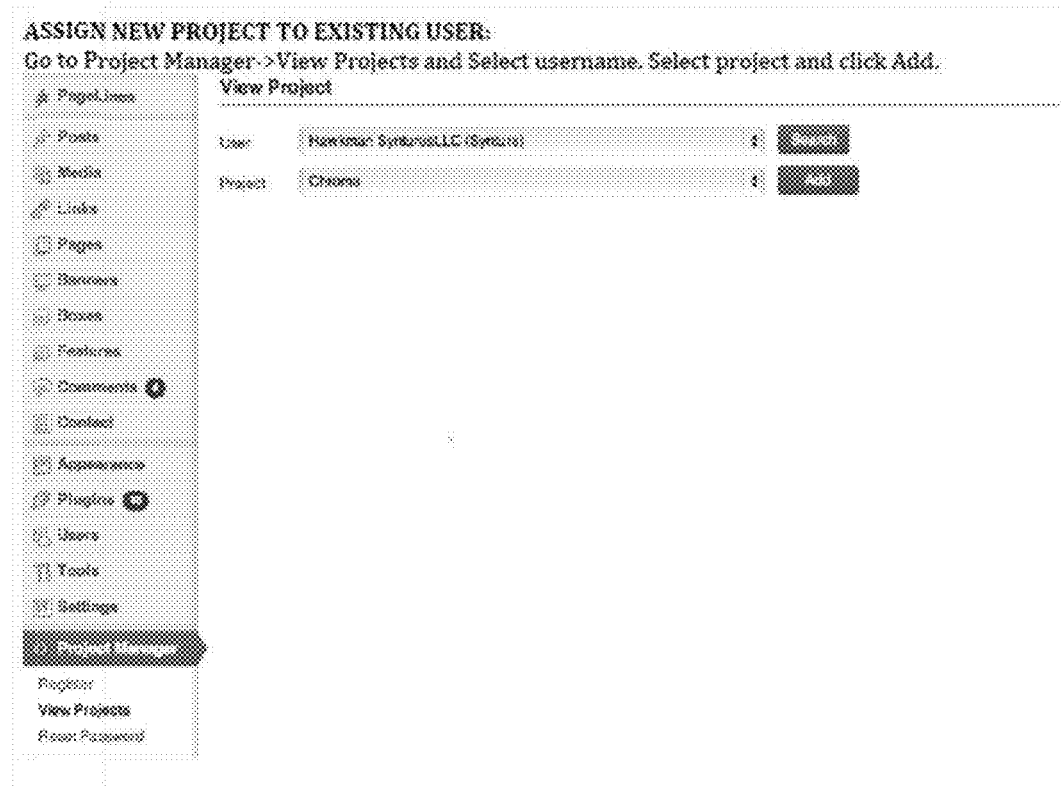
Figure 68:
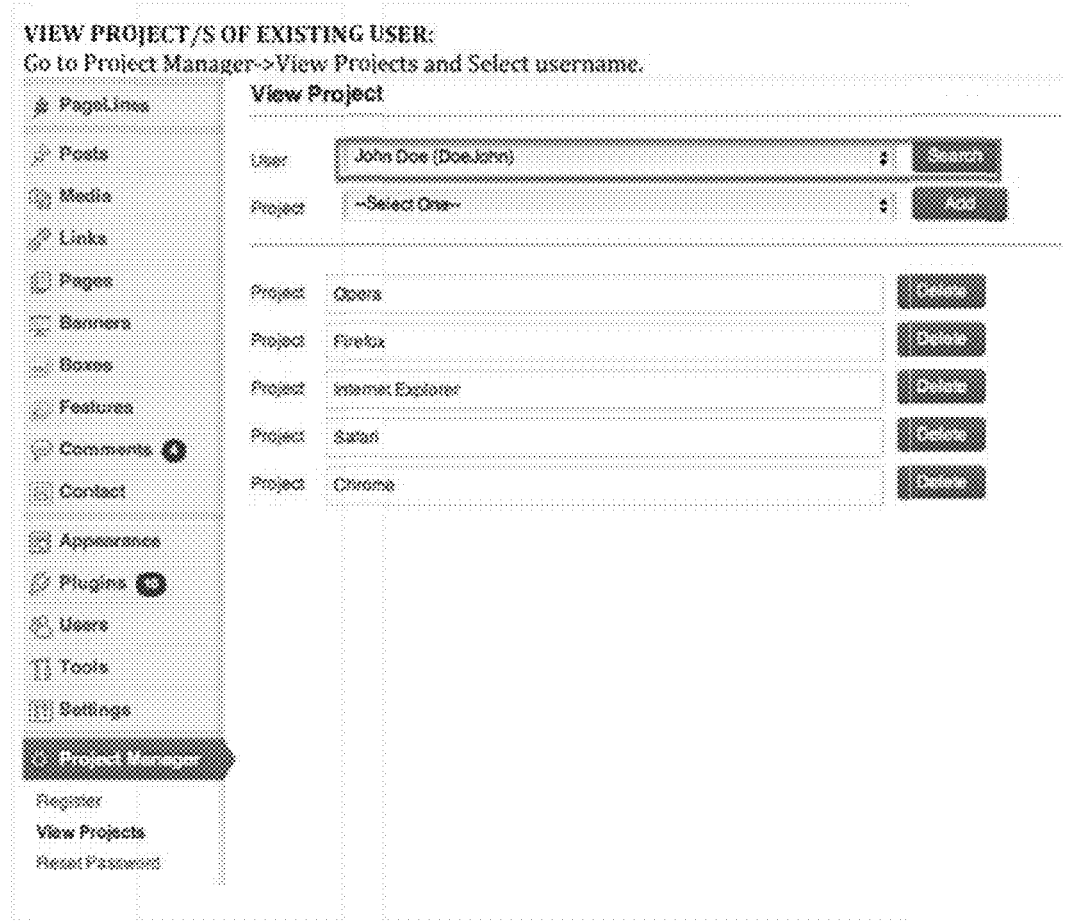
Figure 69:
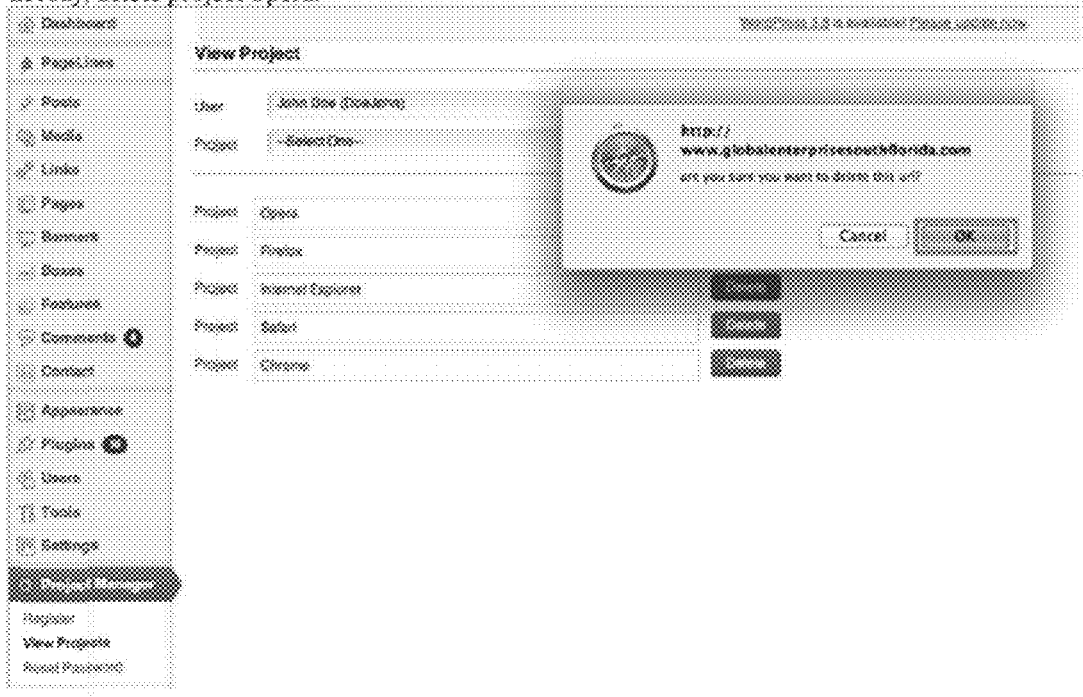
Figure 70:
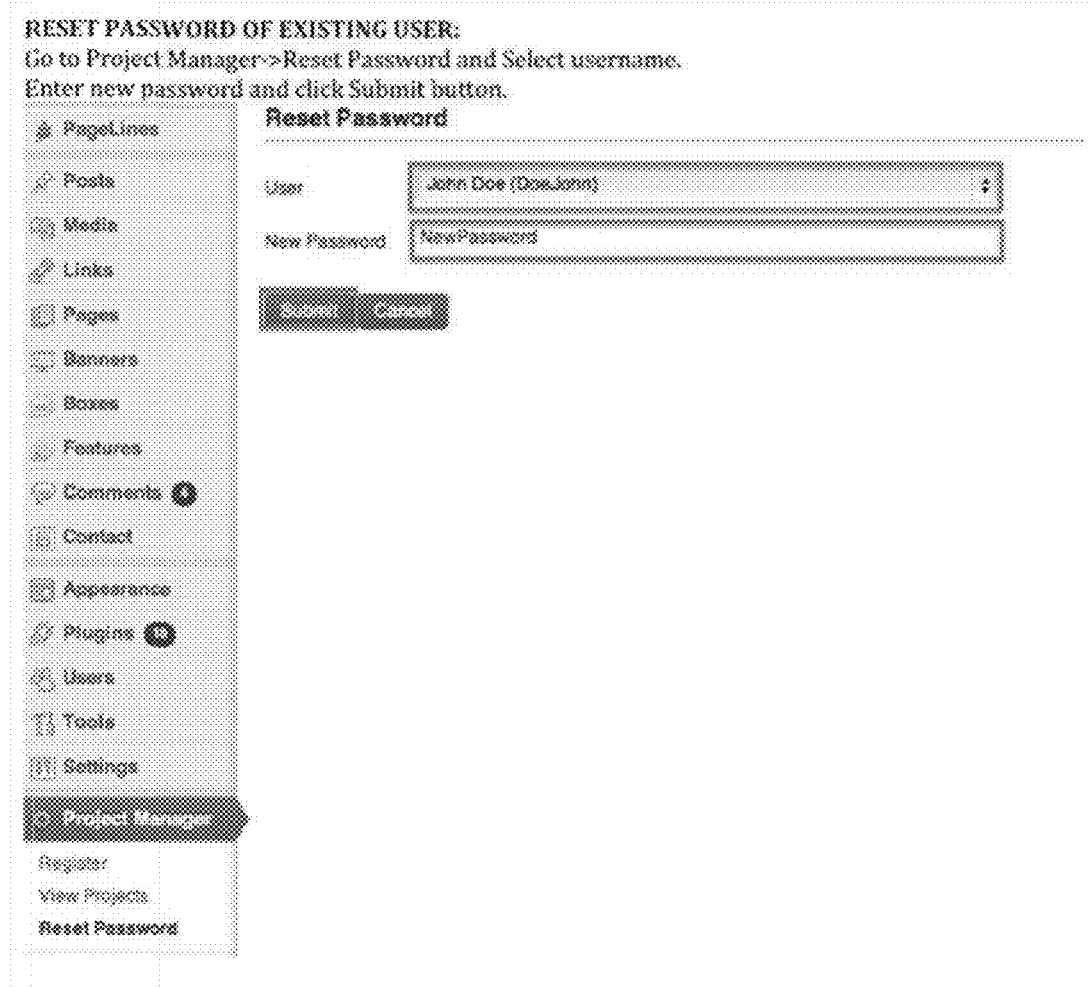

FIG. 11 (screenshot 710) illustrates the Settings page, wherein a user can log-in using their unique login credentials. In this page, the user can go over the Privacy Statement, App version and Term of Use of the app. FIGS. 12-27 illustrate other features/screens of the app.

The present invention provides a commercial software for a Restoration Company and/or Construction Company. In one embodiment, SyncMeIn is a cloud-based system to manage disaster restoration projects that can be synced and shared across multiple mobile devices and desktops computers that provides visibility into the project reporting system in a real-time process via an Internet connection. This is specially designed and customized, centralizing all data, photos and activities, and tracking task completion and project issues. The SyncMeIn system provides real-time visibility into a project's status, progress, and access to documents. It is custom designed to the needs in the industry of disaster restoration and remediation. It is operably configured for navigation on a mobile device (e.g. smartphone or other handheld electronic device), and includes a direct and independent push notification feature that by-passes iTunes for sending announcement notifications directly to the app. The SyncMeIn system further includes a project posting interface 400, and a project manager interface 500, each of which may be communicatively coupled with one another over a network, such as the Internet. SyncMeIn is a service oriented custom Software Application that bridges communications between the WordPress 100 website and the mobile application directly 200. The software enables direct communication between web-based data base and the mobile application interface 200, by eliminating the need to submit to an iTunes service for updates and wait for weeks for approval. Through this bridge, the website can send Push Notifications, send update notifications, synchronize the database, updates, progress reports, documents and posts directly to the mobile app in seconds as opposed to weeks.

The SyncMeIn plugin: Referring now primarily to FIGS. 28-32, screen shots of a Client's WordPress website 100 in accordance with an embodiment the present invention are presented. SyncMeIn is designed to plug-in to any WordPress based platform website and serve as a direct bridge to transport and feed in real-time data, including all media, text, documents and data directly to the mobile app, thereby bypassing the iTunes time-consuming process. Although, the illustrated embodiment is shown as a system for disaster restoration services, it is understood that the present invention is not limited to such services, but can be installed to a WordPress based platform website provided by any company and within any industry.

The Web-based Interface: consumers desiring to view the status of the restoration project can click on the "My Project" tab on the menu bar. The website 100 will then navigate to the "My Project" web page. In one embodiment, the user will be required to enter a secured username and a password to view the "My Project" web page associated with the user's account. The My Project web page includes a progress bar indicator section, a plurality of digital images showing the visual progress of the project over time, and a project documents section that users can click-on to view and/or download documents associated with the project, such as contracts, forms, and other documents. The user may be able to click on each of the digital images in order to be presented an enlarged view of the digital image. The digital images are date stamped and organized chronologically so that the user can view the visual progress of the project as soon as they were posted by the administrator. Along with the digital images posted, each series of images have corresponding remarks, notations, and/or textual updates.

The Mobile App: Referring now primarily to FIGS. 33-50, screenshots of an app 200 in accordance with an embodiment of the present invention are presented. The app 200 provides a user interface that allows a user to log-in to his account with his username and password and view the status of his project on his mobile device. The app 200 enables the User to receive real-time push notifications for announcements, notification of messages and reminders to check the app when new digital images or documents are added to his account for viewing via the app. The notification is specific and exclusive to the User only as long as the User remains logged into the app 200. This will enable the User to receive custom updates and private messages that are unique to the User only via the app 200. There can be provided a project dashboard User interface that shows all projects assigned and unique to the user's account on a single screen. The user can tap on a button or icon associated with a particular project and be navigated to a screen, where a plurality of digital images and report contents associated with the selected project are presented on the mobile device display. Each digital image is preferably dated and/or time stamped so that the user can identify the visual progress of the project over time.

In another embodiment, the user can tap a button or icon associated with a particular date and be navigated to a screen where all of the digital images captured on the particular date are viewable on the mobile device display. There can be provided a multitude of buttons on the screen that allow the user to share the digital image on a social networking site. The app 200 may provide other services associated with the project type, such as, for example, a weather forecast feature and an emergency call button dashboard for an app associated with disaster restoration projects, as in the exemplary embodiment. FIGS. 33-50 illustrate the various features and advantages of the present invention. Advantageously, the system and method is operably configured such that new digital images, contextual updates and/or new documents added to the user's account are updated in-synced as one database that is hosted on a cloud-based server and being shared across multiple devices in real-time. The SyncMeIn technology provides a communication bridge between the website 100 and the app 200, allowing real-time communication there between.

Referring now primarily to FIGS. 51-54, screenshots of the SyncMeIn plug-in 300 in accordance with an embodiment of the present invention are presented. The website 100 and the app 200 are front-end user software modules. On the other hand, the modules 300, 400, 500 are software modules installed and used by the back-end operators, such as a website administrator associated with the project administrator or business owner, providing the website 100 and app 200 to his customers. The SyncMeIn software application 300 is downloaded and installed into a WordPress platform to function as an added plug-in application 100. The SyncMeIn software application 300 will enable the website 100 to manage the "My Project" page contents of the 100 website, upload PDF forms and documents, add updates and progress reports to the My Project page, and directly communicate and synchronize contents across multiple mobile devices. This includes sending push notifications to the app 200 and numerical update(s) indicator on the top right corner of the app in real-time, immediately after the project has been updated via the SyncMeIn software application. Advantageously, the SyncMeIn software application plug-in 300 allows a business owner providing a website 100 and an app 200 to his customers to provide all these synchronized communications and data management technology between the website 100 and the mobile application feature 200 by simply installing a SyncMeIn plug-in at his or her website 100. The SyncMeIn plug-in 300 will then enable direct integration of the website 100 to the mobile application 200, synchronize the data base, and send push notifications to the mobile device running the app of a logged-in user anytime the business owner (or website administrator) updates the user's account by, for example, posting project status, digital images, or documents that are ready for the user's signature, or the like.

For example, a realtor may provide a website and app to his customers. When the realtor finds suitable properties, the realtor may update his customer's account at the website back-end by posting digital images of the suitable property to the customer's account. The website will then automatically send the customer's mobile device a push notification notifying the customer that an update to his account is currently available via the app. Instead of having to send a separate email or make a phone call when an account is updated with new information, the website 100 will send an immediate push notification to the account user's mobile device. Likewise, when the realtor has finalized closing documents that are ready to be reviewed and signed by the customer, the realtor can upload the closing documents to the customer's account via the website back-end. The website 100 will then automatically send the customer's mobile device a push notification notifying the customer that an update to his account is currently available via the app. Push notifications in the current art require the notifications to be sent through a Push Notification Service. The Push Notification Service receives push notification requests and routes those push notifications to mobile devices. There is a problem in the current art that Push Notification Services are backlogged with push notification requests that may take weeks to route to mobile devices. Advantageously, the present invention provides real-time push notifications sent from the website server 7108 to the mobile device 7104 via the Internet 7106, without having to be routed through a Push Notification Service. More specifically, apps for mobile devices are controlled mainly by two regulating services: APPLE CORPORATION'S APP STORE and GOOGLE'S GOOGLE PLAY STORE. In order for apps to be provided through these regulating services, the apps are inspected, mainly for safety of the users, and made available only by downloading through the regulating services. Once they are approved by these regulating services, any further data by the app developer must be provided through those services and not directly to the apps. The present invention, however, breaks this protocol by creating a direct link with the app from the server 7108 and allows the present invention to deliver any content whatsoever directly to the app and, ultimately, the app user. This system and method provides business owners with a convenient plug-in that is able to enhance their websites by enabling personalized push notifications to be sent to customers with a user account immediately upon updating the user's account with relevant information, such as documents, status updates, and digital images. Now, the present invention allows many uses of this direct data transfer from the project update sharing service 7108 to the smart device 7104. For example, updates to the app can be delivered directly to the smart device without going through the regulating service. Further, the device could actually be remote controlled from the server 7108 by telling the app to activate certain functions on the device 7104. For example, the server 7108 could tell the app to turn the device's camera on and take pictures or turn the audio on and record audio and possibly upload the photos or audio to the server 7108. The present invention does this, in one embodiment, by having app connect to the application programming interface (API) as soon as the app is installed and activated. The API resides on the server 7108. The API than controls what takes place on the app installed on the device 7104. In one use, once the app is installed, it engages in real-time synchronization to reflect whatever is on the server 7108.

In one embodiment, the project posting SyncMeIn plugin 400 will perform the function of automatically sending the numerical indicators on the top right of the mobile app icon and send actual real-time updates to the mobile device exclusively to the account holder. In this embodiment, when the back-end operator adds or modifies an existing project using the SyncMeIn plug-in 400, SyncMeIn 300 will automatically send an integrated feed to the mobile app and then send the numerical indicator for new updates. This will include push notifications to the mobile device of the project account holder. In a further embodiment, the database feed and electronic notifications will be sent over the Internet to the mobile device. Accordingly, the mobile device is able to receive data base feed and electronic notifications if it is connected to the Internet. In yet another embodiment, the user is able to receive the data base feed and electronic notifications if the user is logged into his account via the app 200 on his mobile device and the user must be associated with the project that received the update.

In one embodiment, the user provides the business owner with his cellular telephone number. The cellular telephone number is associated with the user's account by, for example, entering the cellular telephone number into data fields provided by the SyncMeIn plug-in 400.

Referring now primarily to FIGS. 55-61, screenshots of the SyncMeIn plug-in 400 in accordance with an embodiment of the present invention are presented. The SyncMeIn plug-in 400 is downloaded and installed at the back-end operator interface of the website 100, such as, for example, a WordPress Administration panel or dashboard. The SyncMeIn plug-in 400 allows the business owner, or website administrator, to add new projects and modify/update existing projects. When a new project is added or an existing project is modified via the SyncMeIn plug-in 400, the SyncMeIn plug-in 300 will automatically be prompted to send a push notification to the mobile device of the project's account holder, notifying him that new data is available regarding his project. When adding a new project, a username and a password are added to protect the account. Subsequently, the user can visit the website 100 and, after logging into his account, the user can view the status of his project(s). Likewise, the user can log into his app 200 and view the status of his project(s) via the app 200 on his mobile device.

Referring now primarily to FIGS. 62-70, screenshots of the SyncMeIn plug-in 500 in accordance with an embodiment of the present invention are presented. The SyncMeIn plug-in 500 is downloaded and installed at the back-end operator interface of the website 100, such as, for example, a WordPress Administration panel or dashboard. The SyncMeIn plug-in 500 allows the business owner, or website administrator, to register users, add new projects to existing users, view projects of existing users, delete projects associated with existing users, and reset passwords for existing users. Each user may have one or more projects associated with his user account. The SyncMeIn plug-in 500 allows the website administrator or business owner to conveniently manage all user accounts, corresponding passwords, and the one or more projects associated with each user account.

SyncMeIn Software plug-in: A WordPress compatible and web based report interface that allows you to deploy secured reports over the Internet with any web browser is disclosed. This also functions as a data feed system, from the Desktop as the source to Mobile Devices as the destination.

Mobile Application: User interface mobile application that integrates and translates data base language of feed from the source website into a language compatible with iOS devices is disclosed. This direct communication eliminates the need to go through the process of submitting data to iTunes for approval each time, a process that takes three weeks or more to get approved and sent to the device. A fully integrated manageable mobile application tool for the Disaster Restoration and Remediation and Construction Companies.

A method and system has been disclosed that allows information to be directly distributed to interested users of mobile devices in real-time or semi-real-time distribution. Only now can users be instantly and continuously updated on the progress of their restoration or construction projects.

What is claimed is:

1. A method comprising steps of:
providing a software application on a plurality of electronic mobile devices; and
providing at least one plug-in for installation on a backend of a WordPress based platform website associated with, and accessible by the software application, the website having a front end accessible by the software application and a backend being operated by a project update sharing server to track a plurality of separate projects, wherein each of the plurality of projects can only be accessed by authorized users through the software application interacting with the front end of the website during a login session, wherein the authorized users include staff users who have edit permission to edit any project to which they are given access, and client users who have only read permission to browse content of projects of the plurality of separate projects with which they are associated via the software application on one of the plurality of electronic mobile devices;
receiving, at the backend of the website on the project update sharing server from one of the staff users, content related to progress of a selected project of the plurality of separate projects, the content including at least one photographic image of completed work for the project, a document, or a status update; and
responsive to receiving the content, the project update sharing server, in executing the plug-in, automatically and immediately pushing an exclusive notification via a direct communication link from the front end of the website to the software application on at least one of the plurality of electronic mobile devices, wherein pushing the exclusive notification occurs only during the login session and is specific to a client user associated with the selected project to which the content relates, wherein the at least one of the plurality of electronic mobile devices corresponds to at least one client user associated with the selected project, thereby giving direct access to the at least one photographic image, document, or status update at the backend of the website without use of a push notification service.

2. The method of claim 1, wherein pushing the exclusive notification comprises pushing an integrated feed to the software application on the mobile device, wherein the integrated feed include numerical update indicators.

3. A method for synchronization and notification of any online posting including uploading of data to a computer running a WordPress based platform website to a mobile device of a particular user without the use of an external push notification service, comprising:
wherein the WordPress based platform website tracks a plurality of separate projects a backend, the uploading of data being data for a particular project of the plurality of projects and including photographic image data of completed work for the project, documents, or status updates, wherein for each project there is at least one staff user and at least one client user that are authorized to access the project, the uploading being performed by the at least one staff user;

using a web-to-app connectivity technology to directly synchronize the posting and the data to the mobile device of particular client user associated with the particular project; and using the web-to-app connectivity technology to directly send a notification to the mobile device associated with the particular client user when a new posting or new uploading of data associated with that particular project posted or uploaded, wherein the notification is sent from a front end of the website during a login session between the mobile device and the website and gives direct access to the photographic image data of completed work for the project, documents, or status updates.

4. A system for synchronization and notification of any online posting including uploading of data to a computer running a WordPress based platform website to a mobile device of a particular user without the use of an external push notification service, comprising:

wherein the WordPress based platform website tracks a plurality of separate projects at a backend, the uploading of data being data for a particular project of the plurality of projects and including photographic image data of completed work for the project, documents, or status updates, wherein for each project there is at least one staff user and at least one client user that are authorized to access the project, the uploading being performed by the at least one staff user;

a web-to-app connectivity technology that directly synchronizes the posting and/or the data to the mobile device of particular client user associated with the particular project; and using the web-to-app connectivity technology to directly send a notification to the mobile device of the particular client user when a new posting or new uploading of data associated with that particular project posted or uploaded, wherein the notification is sent from a front end of the website during a login session between the mobile device and the website and gives direct access to the photographic image data of completed work for the project, documents, or status updates.

* * * * *